(12) United States Patent
Maddahi et al.

(10) Patent No.: US 12,307,918 B2
(45) Date of Patent: May 20, 2025

(54) AUTOMATED MEASUREMENT APPARATUS AND METHOD FOR QUANTIFYING DIMENSIONS OF DENTAL PREPARATION

(71) Applicant: TACTILE ROBOTICS LTD., Winnipeg (CA)

(72) Inventors: Yaser Maddahi, Winnipeg (CA); Maryam Kalvandi, Winnipeg (CA); Ali Maddahi, Winnipeg (CA); Pruthvinath Rao Dhannapuneni, Winnipeg (CA)

(73) Assignee: Tactile Robotics Ltd., Winnipeg (CA)

( * ) Notice: Subject to any disclaimer, the term of this patent is extended or adjusted under 35 U.S.C. 154(b) by 704 days.

(21) Appl. No.: 17/700,823

(22) Filed: Mar. 22, 2022

(65) Prior Publication Data
US 2022/0309953 A1 Sep. 29, 2022

Related U.S. Application Data

(60) Provisional application No. 63/164,759, filed on Mar. 23, 2021.

(51) Int. Cl.
*G09B 23/28* (2006.01)
(52) U.S. Cl.
CPC .. *G09B 23/283* (2013.01); *G06T 2207/30036* (2013.01)
(58) Field of Classification Search
CPC ...... G09B 23/28; G09B 23/283; G01B 11/24; G06T 2200/00; G06T 2200/04; A61B 1/24; A61B 5/0088
See application file for complete search history.

(56) References Cited

U.S. PATENT DOCUMENTS 5,386,292 A * 1/1995 Massen .................. G01B 11/24
356/603
6,217,334 B1 4/2001 Hultgren
(Continued)

FOREIGN PATENT DOCUMENTS

JP 2015136615 7/2015
KR 101852834 4/2018

OTHER PUBLICATIONS

U.S. Appl. No. 12/675,183, filed Oct. 7, 2010, Sadafumi, et al.
U.S. Appl. No. 12/905,266, filed Apr. 21, 2011, Seidl, F., et al.

*Primary Examiner* — Kurt Fernstrom
(74) *Attorney, Agent, or Firm* — Ryan W. Dupuis; Michael R. Williams; Ade & Company Inc.

(57) ABSTRACT

An automated measurement apparatus has a tooth holder receiving a tooth and a measurement sensor that senses a measured distance to a corresponding surface portion of the tooth. Linear and rotational actuation assemblies support the measurement sensor and the tooth holder for translating and angular relative movement. A controller operates (i) the rotational actuation assembly to locate the tooth holder relative to the measurement sensor in one or more angular orientations and (ii) the linear actuation assembly to displace the measurement sensor through an array of measurement locations within a measurement plane to capture the measured distance at each array location at each angular orientation and thereby define a geometry of the tooth surfaces. The controller may define the geometry subsequent to a dental preparation alteration of the tooth and calculate an alteration metric representing one or more aspects of the defined geometry for comparison to a stored target metric.

20 Claims, 10 Drawing Sheets

(56) References Cited

U.S. PATENT DOCUMENTS

| | | | |
|---|---|---|---|
| 6,386,867 B1 * | 5/2002 | Durbin | A61C 9/00 433/25 |
| 6,697,164 B1 * | 2/2004 | Babayoff | G01B 11/24 356/601 |
| 6,885,464 B1 * | 4/2005 | Pfeiffer | A61B 5/0064 433/29 |
| 7,027,642 B2 | 4/2006 | Rubbert et al. | |
| 7,312,924 B2 | 12/2007 | Trissel | |
| 7,494,388 B2 | 2/2009 | Durbin et al. | |
| 7,573,583 B2 | 8/2009 | Quadling et al. | |
| 7,672,504 B2 | 3/2010 | Childers | |
| 7,702,492 B2 | 4/2010 | Marshall | |
| 7,728,989 B2 | 6/2010 | Doherty et al. | |
| 8,279,450 B2 | 10/2012 | Sadafumi et al. | |
| 8,989,567 B1 | 3/2015 | Pulido et al. | |
| 9,192,305 B2 | 11/2015 | Levin | |
| 9,412,166 B2 | 8/2016 | Getto et al. | |
| 9,439,568 B2 * | 9/2016 | Atiya | A61B 5/0088 |
| 9,737,381 B2 | 8/2017 | Lee | |
| 9,937,023 B2 | 4/2018 | Andersson et al. | |
| 10,456,043 B2 | 10/2019 | Atiya et al. | |
| 10,463,458 B2 | 11/2019 | Jumpertz | |
| 10,542,946 B2 * | 1/2020 | Martin | A61B 1/0684 |
| 10,588,501 B2 * | 3/2020 | Salah | H04N 23/57 |
| 10,606,911 B2 | 3/2020 | Elbaz et al. | |
| 10,667,887 B2 | 6/2020 | Rohaly et al. | |
| 10,792,133 B2 | 10/2020 | Moon | |
| 11,382,559 B2 * | 7/2022 | Liu | A61B 5/0077 |
| 11,529,219 B2 * | 12/2022 | Fan | A61B 1/24 |
| 11,998,457 B2 | 6/2024 | MacMillan et al. | |
| 2013/0330684 A1 * | 12/2013 | Dillon | A61B 1/00042 433/29 |
| 2020/0297201 A1 * | 9/2020 | Wakazome | A61B 1/00045 |
| 2020/0334813 A1 * | 10/2020 | Salah | A61C 9/0053 |

* cited by examiner

AUTOMATED MEASUREMENT APPARATUS AND METHOD FOR QUANTIFYING DIMENSIONS OF DENTAL PREPARATION

This application claims the benefit under 35 U.S.C. 119(e) of U.S. provisional application Ser. No. 63/164,759, filed Mar. 23, 2021.

FIELD OF THE INVENTION

The present invention relates to a measurement system that is used to quantify the dimensions of one or more teeth (dental preparations) after the completion, or during the performance, of a dental operation. More particularly, the present invention relates to a method to assess the dental performance skills of dental trainees by using an automated measurement system and method of use of the automated measurement system to compare the geometry of the tooth by comparing the captured dimensions of dental preparations in both pre-op and post-op scenarios relative to a prescribed target geometry.

BACKGROUND

Currently, teaching dental students how to conduct dental operations in operative dentistry is primarily taught and learned through the traditional model. The trainer conducts a dental task on a tooth, and the apprentices then acquire technical aspects of dental skills and start practicing. When it comes to practice, the apprentices conduct dental preparations on the tooth in the pre-clinic. Once the dental apprentice completes dental preparations, the work is submitted to the trainer for grading and having feedback. The trainer then uses some tools such as a caliper to measure dimensions (length, depth and angle) of the dental preparation. Prior to the submission, trial and error often constitutes a significant part of the apprentices' learning of psychomotor skills to reach a stage that they feel comfortable conducting the task. When the apprentices have an apparatus to provide automatic measurements of a dental preparation, the operating hours and training resources available decrease. Besides, such an apparatus can improve training efficiency and provide realistic feedback on the dental skill of each apprentice.

In dentistry training programs, the use of classroom and hands-on training by experts has been the standard mechanism of instruction. This is also called the traditional novice-expert apprenticeship model, as described in K. Kunkler, "The role of medical simulation: an overview", Int. J. of Medical Robotics and Computer Assisted Surgery, vol. 2 pp. 203-210, 2006. In this traditional model, dental and dental hygiene students (hereafter called apprentices) acquire technical dental skills through years of hands-on training in dental laboratories, pre-clinic laboratories, and clinics, and receive supervision and feedback from their instructors relating to dental performance skills. Specifically, instructors conduct a procedure and the apprentices observe, then assist, and finally perform that procedure under instructor supervision. This is apprentices acquire years of hands-on training and practice in mastering the required skills.

Durbin D, Durbin D, Dalmia A, Childers E, inventors; IOS Technologies Inc. assignee. 3D dental scanner. U.S. Pat. No. 7,494,338. 2009 Feb. 24 discloses systems and methods for optically imaging a dental structure within an oral cavity by moving one or more image apertures on the arm coupled to a fixed coordinate reference frame external to the oral cavity; determining the position of the one or more image apertures using the fixed external coordinate reference frame; capturing one or more images of the dental structure through one or more of the image apertures, and generating a 3D model of the dental structure based on the captured images.

Jumpertz R, inventor; Dentsply Sirona Inc, assignee. Extraoral dental scanner. U.S. Pat. No. 10,463,458. 2019 Nov. 5 discloses an extraoral dental scanner for 3D capture of the surface of a dental shaped part with a 3D measuring camera having an optical axis, wherein the means for the machine-controlled relative positioning of the 3D measuring camera and the dental shaped part are embodied in such a way that the means for taking up and positioning the dental shaped part can be moved into a parking position outside a region that can be captured optically by the 3D measuring camera, with a work plate for manually positioning the dental shaped part in the measurement volume of the 3D measuring camera, wherein the work plate is aligned perpendicularly to the optical axis and wherein the work plate, as viewed from the 3D measuring camera, is arranged behind the means for taking up and positioning the dental shaped part, makes it possible to record uninterrupted 3D image data with very short recording times both by automatic and by manual positioning of dental shaped parts of different sizes and embodiment variants.

Andersson M, Fäldt J, Karlsson P O, inventors; Nobel Biocare Services AG, assignee. Method and apparatus for obtaining data for a dental component and a physical dental model. U.S. Pat. No. 9,937,023. 2018 Apr. 10 discloses methods for obtaining data and for manufacturing a dental component and a physical dental model of at least a part of a dental structure are provided which can improve processing times and provide sufficient manufacturing accuracy. An embodiment of the method can comprise obtaining a first data record for manufacturing the dental component and a second data record for manufacturing the physical dental model. The first data record can comprise data based on a portion of a digital dental model. The second data record can comprise data based on at least the portion of the digital dental model. In this regard, the data upon which the first and second data records are based can be obtained using first and second scanning resolutions in order to improve processing times and provide sufficient accuracy.

Levin A, inventor; Align Technology Inc, assignee. Estimating a surface texture of a tooth. U.S. Pat. No. 9,192,305. 2015 Nov. 24 discloses embodiments for estimating a surface texture of a tooth are described herein. One method embodiment includes collecting a sequence of images utilizing multiple light conditions using an intra-oral imaging device and estimating the surface texture of the tooth based on the sequence of images.

Steingart B, Rawley C, Cook C, Itkowitz B, Kittler R, James B, Cooper B, inventors. Systems for haptic design of dental restorations. U.S. patent application Ser. No. 11/998,457. 2008 Oct. 23 discloses an invention that provides systems for integrated haptic design and fabrication of dental restorations that provide significant advantages over traditional practice and existing computer-based systems. The systems feature technical advances that result in significantly more streamlined, versatile, and efficient design and fabrication of dental restorations. Among these technical advances are the introduction of voxel-based models; the use of a combination of geometric representations such as voxels and NURBS representations; the automatic identification of an initial preparation (prep) line and an initial path of insertion; the ability of a user to intuitively, haptically adjust the initial prep line and/or the initial path of insertion;

the automatic identification of occlusions and draft angle conflicts (e.g., undercuts); the haptic simulation and/or marking of occlusions and draft angle conflicts; and coordination between design output and rapid prototyping/milling and/or investment casting.

Trissel R G, inventor; IOS TECHNOLOGIES, assignee. Polarizing multiplexer and methods for intra-oral scanning. U.S. Pat. No. 7,312,924. 2007 Dec. 25 discloses a polarizing multiplexer includes a first arm with a first beam splitter to receive a first unpolarized light from an object and a first retarder coupled to the first beam splitter to generate a first right-hand circularly polarized (RHCP) beam. A normal incident beam splitter is used to receive the first RHCP beam. The multiplexer also includes a second arm with a second beam splitter to receive a second unpolarized light from an object; and a second retarder coupled to the second beam splitter to generate a left-hand circularly polarized (LHCP) beam, wherein the LHCP beam is reflected off the normal incident beam splitter and converted to a second RHCP beam. Light from both arms pass through the second retarder and are converted to p-polarized light before transmitting through the second beam splitter to an image sensor.

Sadafumi O O, Hamano S, Sugata F, inventors; Panasonic Corp, assignee. Intra-oral measurement device and intra-oral measurement system. U.S. patent application Ser. No. 12/675,183. 2010 Oct. 7 discloses an intra-oral measurement device according to the present invention is provided with a light projecting unit for irradiating lights in at least two different wavelengths along an identical light axis toward an object to be measured that includes at least a tooth in an oral cavity, and an image pickup unit for receiving lights reflected on the object to be measured and picking up an image, so that an intra-oral shape can be accurately measured without spraying the metal powder within the oral cavity.

Childers E M, inventor; IOS TECHNOLOGIES, assignee. Method and system for obtaining high resolution 3-D images of moving objects by use of sensor fusion. U.S. Pat. No. 7,672,504. 2010 Mar. 2 discloses a system to scan 3D images applies sensor fusion of a passive triangulation sensor in combination with an active triangulation sensor to obtain high resolution 3D surface models from objects undergoing arbitrary motion during the data acquisition time.

Sadafumi O O, Hamano S, Sugata F, inventors; Panasonic Corp, assignee. Intra-oral measurement device and intra-oral measurement system. U.S. Pat. No. 8,279,450. 2012 Oct. 2 discloses an invention that aims to provide an intra-oral measurement device and an intra-oral measurement system capable of measuring an inside of an oral cavity at high accuracy without increasing a size of the device, and includes a light projecting unit for irradiating a measuring object including at least a tooth within an oral cavity with light, a lens system unit for collecting light reflected by the measuring object, a focal position varying mechanism for changing a focal position of the light collected by the lens system unit, and an imaging unit for imaging light passed through the lens system unit.

Quadling H S, Quadling M S, Blair A, inventors; D4D Technologies LP, assignee. Laser digitizer system for dental applications. U.S. Pat. No. 7,573,583. 2009 Aug. 11 discloses an intra-oral laser digitizer system provides a 3D visual image of a real-world object such as a dental item through a laser digitization. The laser digitizer captures an image of the object by scanning multiple portions of the object in an exposure period. The intra-oral digitizer may be inserted into an oral cavity (in vivo) to capture an image of a dental item such as a tooth, multiple teeth or dentition. The captured image is processed to generate the 3D visual image.

Atiya Y, Verker T, inventors; Align Technology Inc, assignee. Compact confocal dental scanning apparatus. U.S. Pat. No. 10,456,043. 2019 Oct. 29 discloses apparatuses and methods for confocal 3D scanning. The apparatus can comprise a spatial pattern disposed on a transparent base and a light source configured to provide illumination to the spatial pattern and an optical system comprising projection/imaging optics having one or more lenses and an optical axis. The projecting/imaging optics may be scanned to provide depth scanning by moving along the optical axis.

Hultgren B W, inventor; Iris Development Corp, assignee. Dental scanning method and apparatus. U.S. Pat. No. 6,217,334. 2001 Apr. 17 discloses a dental and soft tissue scanning method and system is disclosed which uses fast laser line scanning techniques of negative image impressions, whereby an array of electronic data is generated. In operation the array of negative image scan data is generated by a scanner and provided to a processor. The negative image scan data may be saved in a memory device as a permanent record of the baseline condition of the patient's teeth, or temporarily prior to one of several other options. The processor may convert the data to a positive image for display on the video display unit for teaching or educational purposes with the patient. Alternatively, the positive information data may be transmitted to a remote PC for storage, study by a consulting dentist (or physician), or fabrication of a study cast by fabrication device. These and other options may be selected by the user of computer via the input device. The programming operation of the processor provides for scanning each of the upper and lower impressions and the bite registration impression. These scans provide the information necessary to create an electronic equivalent of a physical study cast.

Elbaz G, Lampert E, Atiya Y, Kopelman A, Saphier O, Moshe M, Ayal S, inventors; Align Technology Inc, assignee. Intraoral scanner with dental diagnostics capabilities. U.S. Pat. No. 10,606,911. 2020 Mar. 31 discloses methods and apparatuses for generating a model of a subject's teeth. Described herein are intraoral scanning methods and apparatuses for generating a 3D model of a subject's intraoral region (e.g., teeth) including both surface features and internal features. These methods and apparatuses may be used for identifying and evaluating lesions, caries and cracks in the teeth. Any of these methods and apparatuses may use minimum scattering coefficients and/or segmentation to form a volumetric model of the teeth.

Doherty M, Daniel Y, Zeitlin E, Sanilevici K, Sirat G Y, Agronik G, inventors; Optimet Optical Metrology Ltd, assignee. Double-sided measurement of dental objects using an optical scanner. U.S. Pat. No. 7,728,989. 2010 Jun. 1 discloses methods for digitizing complex surfaces of dental objects such as impressions of dental surfaces and shapes. While an impression mold is being scanned by translation along a known trajectory, typically in a plane, the line of sight of a distance probe is directed toward successive positions on the surface of the impression mold, such as by a periodic series of reflecting surfaces characterized by normal vectors at distinct non-orthogonal angles with respect to their axis of symmetry. One or more reference objects are scanned using the same translation and mirror positioning systems. Gathered coordinate data are processed to apply angular corrections and combined to form a single distortion-corrected image of the impression mold. An apparatus and methods are provided for measuring both sides of a dental object separately, and then registering the two sides relative to each other in a digital representation of the object.

Rohaly J, Nazzal R N, Tekeian E K, Kriveshko I A, Paley E B, inventors; Midmark Corp, assignee. Video-assisted margin marking for dental models. U.S. Pat. No. 10,667,887. 2020 Jun. 2 discloses tools are described for preparing digital dental models for use in dental restoration production processes, along with associated systems and methods. Dental modeling is improved by supplementing views of 3D models with still images of the modeled subject matter. Video data acquired during a scan of the model provides a source of still images that can be displayed alongside a rendered 3D model, and the two views (model and still image) may be synchronized to provide a common perspective of the model's subject matter. This approach provides useful visual information for disambiguating surface features of the model during processing steps such as marking a margin of a prepared tooth surface for a restoration. Interactive modeling tools may be similarly enhanced. For example, tools for margin marking may synchronize display of margin lines between the still image and the model so that a user can interact with either or both of the visual representations, with changes to a margin reflected in both displays.

Lee Y, inventor; DOF Inc, assignee. Desktop three-dimensional scanner for dental use provided with two-axis motion unit in which camera and projector are coupled to unit for changing horizontal axis of rotation of stage. U.S. Pat. No. 9,737,381. 2017 Aug. 22 discloses a desktop 3D scanner for dental use of the related art, a two-axis rotation motion unit, on which a target object can be placed and rotated in order to image the entire shape of the target object, is coupled to the scanner, and thus, when a subject is placed on the imaging stage and is rotated along the horizontal axis of rotation of the stage, the subject is dropped from the stage by gravity after being inclined, and accordingly, additional fixing means or a receiving jig should be placed on the stage together with the subject to prevent same. In such a case, inconvenience is caused because the target objects to be scanned have various shapes and the fixing means or receiving jigs should fit the shapes thereof. According to one embodiment of the desktop 3D scanner for dental user of the present invention, a camera and a projector are provided on the unit for changing the horizontal axis of rotation of the imaging stage, and thus a target object does not have to be inclined during the scanning process and dental prostheses of various shapes can be three-dimensionally scanned even without additional fixing means or a receiving jig.

Marshall M C, inventor; GeoDigm Corp, assignee. System and method for generating an electronic model for a dental impression having a common coordinate system. U.S. Pat. No. 7,702,492. 2010 Apr. 20 discloses a system for generating an electronic model having a common coordinate system that includes a scanning device; a first plate module; and a second plate module. Each of the plate modules is configured to separately couple to the scanning device. The plate modules also can be moveably coupled together using an articulation device. Each of the plate modules includes alignment structures (e.g., spheres) to facilitate determining a position and orientation of the plate modules within a coordinate system of the scanning device.

Getto P, Sachdeva R, Sporbert P, Kaufmann M, inventors; Orametrix Inc, assignee. Generating three dimensional digital dentition models from surface and volume scan data. U.S. Pat. No. 9,412,166. 2016 Aug. 9 discloses a method and apparatus are disclosed enabling an orthodontist or a user to create an integrated 3D digital model of the dentition, and surrounding anatomy of an orthodontic patient from a 3D digital model obtained using a scanner with a 3D digital model obtained using a Cone Beam Computed Tomography (CBCT) or Magnetic Resonance Tomography (MRT) imaging devices. The digital data obtained from scanning as well as from CBCT imaging are downloaded into a computer workstation, and registered together in order to create a comprehensive 3-D model of the patient's teeth with roots, bones and soft tissues. The invention provides a substantial improvement over the traditional 2S imaging modalities such as x-rays, photographs, cephalometric tracing for diagnosis and treatment planning.

Seidl F, Schaller H, inventors; Straumann Holding AG, assignee. Scanning device for scanning dental objects and a method for scanning dental objects. U.S. patent application Ser. No. 12/905,266. 2011 Apr. 21 discloses scanning device for scanning dental objects having a base plate to which dental objects can be attached and a mounting structure such as a mounting plate to which an optical scanning system is attached and means for moving the mounting structure. Furthermore, a method for scanning dental objects includes the steps of (a) attaching a dental object to the base plate of the scanning device, wherein a first angle between the surface of the base plate and the surface of the mounting structure is enclosed or the plane defined by the optical axes of the scanning device, (b) scanning the attached dental object to obtain a first data set, (c) using the means for moving the mounting structure to change the first angle to a second angle, and (d) scanning the attached dental object to obtain a second data set.

Rubbert R, Weise T, Sporbert P, Imgrund H, Kouzian D, inventors; Orametrix Inc, assignee. Methods for registration of three-dimensional frames to create 3D virtual models of objects. U.S. Pat. No. 7,027,642. 2006 Apr. 11 discloses a method and system are provided for constructing a virtual 3D model of an object using a data processing system, and at least one machine-readable memory accessible to the data processing system. A set of at least two digital 3D frames of portions of the object are obtained from a scanner or other source comprising a set of point coordinates in a 3D coordinate system providing differing information of the surface of the object. The frames provide a substantial overlap of the represented portions of the surface of the object, but do not coincide exactly. Data representing the set of frames are stored in the memory and processed by the data processing system so as to register the frames relative to each other to thereby produce a 3D virtual representation of the portion of the surface of the object covered by the set of frames.

Pulido A F, Garcia D D, inventors; Apollo Oral Scanner LLC, assignee. Dental scanner device and system and methods of use. U.S. Pat. No. 8,989,567. 2015 Mar. 24 discloses a 3D scanner device for generating a 3D surface model of shaped objects, such as dental structures, applicable for use in the field of dentistry, particularly to dental prosthetics manufacturing. Methods and systems relating to the device are also disclosed.

JP2015136615A provides an intraoral fixed type 3D oral cavity scanner that allows a user to easily acquire 3D images of the teeth and gums and acquire high-quality 3D images of the teeth and gums even when the patient moves, and that can be easily used even by unskilled persons. An intraoral fixed type 3D oral cavity scanner 100 includes: a housing 110 that can be located within an oral cavity of a patient; a photographing unit 120 that is coupled to the housing and photographs part of the patient's teeth; and a fixing portion 130 that is extended from the housing and that is bitten by the patient, so that the housing is fixed within the oral cavity.

KR101852834B1 discloses a 3D scanner that includes: a lens unit having a 360-degree angle of view; And an image processing unit for receiving a pattern image from a subject irradiated with a pattern and generating a 3D image of the subject based on the pattern image.

Moon J B, inventor; DDS Co, assignee. 3D scanner and artificial object processing device using the same. U.S. Pat. No. 10,792,133. 2020 Oct. 6 discloses a 3D scanner according to an embodiment of the present invention includes a pattern generating device irradiating a light pattern to a subject and an imaging device receiving an omnidirectional image of the subject to which the light pattern is irradiated.

Logozzo, Silvia, et al. "Recent Advances in Dental Optics—Part II: Experimental Tests for a New Intraoral Scanner." Optics and Lasers in Engineering, vol. 54, Elsevier Ltd, 2014, pp. 187-96, doi:10.1016/j.optlaseng.2013.07.024 explains testing the performance of a new device for 3D oral scanning: a two-channel PTOF (pulsed time-of-flight) laser scanner, designed for dental and industrial applications in the measurement range of zero to a few centimetres. The application on short distances (0-10 cm) has entailed the improvement of performance parameters such as single-shot precision, average precision and walk error up to mm-level and to μm-level, respectively. The single-shot precision (σ-value) has resulted in ranging from 43 to 63 ps (9-10 mm), having considered the measurement range (6.5-10 mm) corresponding to 1-2V signal; this result agrees well with estimates made from simulations. The average precision has resulted in being dependent on the number of measurements and can reach a value equal to ±25 μm whenever the measurement frequency is sufficiently high. For example, if the required scanning speed is 1000 points/s and the required average precision is ±25 μm, then a pulses frequency of 30-50 MHz is needed, considering signal amplitude varying between 1-2V. On the whole, the performance of this new device, based on PTOF has proven to be adequate to its employment in the field of restorative dentistry.

SUMMARY OF THE INVENTION

The present invention relates to a measurement system that is used to quantify the dimensions of one or more teeth (dental preparations) after the completion, or during the performance, of a dental operation. According to a preferred embodiment, the present invention relates to a method to assess the dental performance skills of dental trainees by using an automated measurement system and method of use of the automated measurement system such that:
(i) the automated measurement system is connected to the trainee or trainer computer and is controlled through a software to automatically measure the dimensions of dental preparations before (pre-op) and after (post-op) performing a dental procedure;
(ii) the automated measurement system is used to compare the geometry of the tooth by comparing the captured dimensions of dental preparations in both pre-op and post-op scenarios;
(iii) a software connects the automated measurement system at the trainer workstation to each trainee's workstation to transfer measured geometry from a trainee's workstation to the trainer workstation, and vice versa, in a real-time or offline fashion;
(iv) the software controls the hardware of the system and computes necessary calculations to render the collected points in three and two-dimensional renderings; and/or
(v) the tooth or a group of teeth is located inside the automated measurement system in a particular direction given by the software.

Knowledge of tooth morphology and anatomy is essential in dentistry. For example, crown morphology is essential in the restorative treatment and prosthodontic treatment, and external root morphology influences the success of oral surgery, periodontal treatment, orthodontic treatment, and prosthodontic treatment. By using this invention, dental apprentices are able to receive quantified feedback on their dental preparations and dental skills and are able to understand, learn, and practice while continuous feedback is provided by the automated measurement system with or without the presence of their trainer. The automated measurement system could be used in a classroom, dental laboratory, dental clinic, or remote location. Another application is to assess the performance skills of practicing dentists after completing a dental preparation in a clinic or a continuing education course.

The disclosure relates to an automated measurement system for providing the measurements of one or more teeth for use by an expert dentist or a dental instructor, hereafter called a dental trainer, to assess the dental performance of one or more dental apprentices or students, called a dental trainee. The system can be used at one or more trainee's workstations or trainer's workstations as a standalone platform or in combination with other systems. Each trainee's workstation or trainer's workstation includes a software showing measurements and dimensions as well as statistical and graphical information of the dental performance of trainees while a dental procedure is completed. The same automated measurement system is used in either trainee's workstation or the trainer's workstation, while the software used may be different. The automated measurement system includes a processing unit to operate the actuation system and read data from the sensory system in an automatic manner. Alternatively, the training system provides each trainee and trainer with a three-dimensional graphical presentation along with different two-dimensional views of the tooth while providing precise and accurate measurement of tooth geometry with respect to the base frame. The automated measurement system allows the apprentices to assess their skills during the performance of dental operations. The automated measurement system may be used without the trainer's workstation for practice purposes.

Using the traditional novice-expert apprenticeship model in the field of dentistry, the actions performed while teaching versus practicing differ, as the task is normally done by the instructor and the apprentices then practice that task. Having a method and process that allows the instructor to assess/score dental operations in a consistent and accurate manner would help apprentices have a better understanding of their dental skill and implement the knowledge learned in the classroom more quickly and efficiently. Currently, dentistry schools are lacking this technology.

The students can get quantified feedback on their dental work and skills, and are able to understand, learn, and practice while continuous feedback is provided by the automated measurement system with or without the presence of their instructor. This system could be used in a classroom, dental laboratory, dental clinic, or at a remote location. Another application of this technology is to assess the performance skills of practicing dentists after the completion of a dental procedure, in either clinics or continuing education courses.

According to one aspect of the present invention there is provided an automated measurement apparatus for measuring dimensions of a tooth having a plurality of surfaces, the apparatus comprising:
a base frame;
a tooth holder supported on the base frame and arranged to support the tooth therein;
a measurement sensor supported on the base frame and arranged to sense a measured distance along a measurement axis of the sensor between the measurement sensor and a corresponding surface portion of one of the surfaces of the tooth;
a first actuation assembly supporting the measurement sensor for translating movement relative to the tooth holder along two different translating axes within a measurement plane oriented perpendicularly to the measurement axis;
a second actuation assembly supporting the tooth holder for angular movement relative to the measurement sensor about at least one rotational axis oriented parallel to the measurement plane between a plurality of different angular orientations corresponding to different ones of the surfaces of the tooth to be measured respectively;
a controller operatively connected to the measurement sensor, the first actuation assembly and the second actuation assembly, whereby the controller is arranged to:
(i) operate the second actuation assembly to locate the tooth holder relative to the measurement sensor in at least one of the angular orientations of the second actuation assembly; and
(ii) for said at least one of the angular orientations of the second actuation assembly, operate the first actuation assembly to displace the measurement sensor relative to the tooth holder through an array of measurement locations within the measurement plane to capture the measured distance to the corresponding surface portion at each measurement location for the respective surface of the tooth and thereby define a geometry of the respective surface of the tooth.

According to the illustrated embodiment, the first actuation assembly supports the measurement sensors for movement relative to the base frame within the measurement plane and the second actuation assembly supports the tooth holder for angular movement relative to the base frame between the different angular orientations.

The controller is preferably arranged to (i) operate the second actuation assembly to locate the tooth holder in a plurality of the angular orientations of the second actuation assembly, (ii) operate the first actuation assembly to displace the measurement sensor relative to the tooth holder through said array of measurement locations within the measurement plane at each of the angular orientations to capture the measured distance to the corresponding surface portion at each measurement location, and (iii) generate a three dimensional model of the tooth using the captured measured distances from each of the measurement locations.

According to the illustrated embodiment, said at least one rotational axis of the second actuation assembly comprises (i) a first rotational axis and (ii) a second rotational axis oriented transversely to the first rotational axis; however, the second actuation assembly may support the tooth holder for rotation about one, two or three rotational axes in further embodiments. In the instance, of two rotational axes, the second actuation assembly preferably comprises (i) a first rotary actuator driving rotation of the tooth holder relative to the measurement sensor about the first rotational axis and (ii) a second rotary actuator driving rotation of the tooth holder relative to the measurement sensor about the second rotational axis.

According to the illustrated embodiment, when the measurement sensor is supported for movement along the two different translating axes including a first translating axis and a second translating axis oriented transversely to the first translating axis, the first actuation assembly preferably includes (i) a first linear movement actuator driving linear movement of the measurement sensor relative to the tooth holder along the first translating axis and (ii) a second linear movement actuator driving linear movement of the measurement sensor relative to the tooth holder along the second translating axis.

The tooth holder is preferably arranged to support the tooth at a prescribed location and orientation relative to a reference point of the tooth holder. In this instance, the controller may be further arranged to calculate a location of each measured surface portion relative to the reference point using the corresponding measured distance measured by the measurement sensor.

The tooth holder may cooperate with a plurality of adapter members arranged to be interchangeably mounted within an adapter socket in the tooth holder, in which each adapter member is mountable within the adapter socket in a single prescribed orientation, and each adapter member further comprises a tooth socket arranged to receive a conventional model tooth therein in a single prescribed orientation. In this instance, the tooth sockets of the adapter members are preferably different from one another such that each adapter member is arranged to receive one of a plurality of differently configured conventional model teeth therein.

When the apparatus further includes an input device arranged to receive user input, the controller may include a plurality of measurement modes corresponding to different surfaces or contours of the tooth to be measured in which each measurement mode defining a unique operating sequence of the first and second actuation assemblies such that the controller may be further arranged to select one or more of the angular orientations of the second actuation assembly and operate the first actuation assembly at each selected angular orientation according to selection of the measurement mode input by a user through the input device.

The apparatus is preferably associated with a display, in which the controller is arranged for communicating a graphical image to the display and is arranged to generate the graphical image such that the graphical image represents the geometry of the tooth defined by the measured distances captured by the measurement sensor. The controller may be arranged to generate the graphical image by (i) rendering a two-dimensional image of the tooth representing the geometry of the tooth defined by the measured distances captured by the measurement sensor, or (ii) rendering a three-dimensional image of the tooth representing the geometry of the tooth defined by the measured distances captured by the measurement sensor.

The controller may be further arranged to operate the first actuation assembly and the measurement sensor to capture the measured distance at a prescribed number of measurement locations per unit of prescribed length across the array, in which said prescribed number of measurement locations is adjustable in response to user input through an input device in communication with the controller, whereby a resolution of the defined geometry of the respective surface of the tooth is adjusted by adjusting said prescribed number of measurement locations.

The controller may be further arranged to (i) determine if the measured distance was not captured at one of the measurement locations designated by the controller and (ii) generate an alert to be communicated to a user of the apparatus in response to determination that the measured distance was not captured at said one of the measurement locations designated by the controller.

The controller is preferably arranged to (i) define the geometry of the surface of the tooth subsequent to an alteration of an anatomy of the tooth resulting from a dental preparation task and (ii) compare the defined geometry of the surface of the tooth to a prescribed tooth geometry before alteration to calculate an alteration amount between the defined geometry and the prescribed tooth geometry before alteration.

According to a further aspect of the present invention there is provided an automated measurement apparatus for measuring dimensions of a tooth having a plurality of surfaces, the apparatus comprising:
 a base frame;
 a tooth holder supported on the base frame and arranged to support the tooth therein;
 a measurement sensor assembly supported on the base frame so as to be arranged to capture measurement data related to the shape of the tooth;
 a controller operatively connected to the measurement sensor assembly so as to be arranged to define a geometry of one or more of the surfaces of the tooth based on measurement data captured by the measurement sensor assembly;
 the controller being further arranged to (i) define the geometry of the tooth subsequent to an alteration of the tooth and (ii) calculate an alteration amount between the defined geometry and a prescribed tooth geometry before alteration of the tooth by comparing the defined geometry of the tooth to the prescribed tooth geometry before alteration.

The controller is preferably further arranged to generate a graphical representation of the defined geometry of the tooth subsequent to the alteration superimposed upon the prescribed tooth geometry before alteration.

Preferably, the controller is further arranged to compare the calculated alteration amount to a target alteration amount stored on the controller and calculate a score representing a similarity between the calculated alteration amount and the target alteration amount.

When used in cooperation with a trainer apparatus which is substantially identical to the automated measurement apparatus, the target alteration amount used in the calculation of the similarity score may be derived from an auxiliary tooth having a geometry defined by the trainer apparatus subsequent to an alteration of the auxiliary tooth by a trainer.

The controller may be further arranged to (i) define the geometry of the surface of the tooth subsequent to an alteration of an anatomy of the tooth resulting from a dental preparation task and (ii) calculate an alteration metric representing one or more aspects of the defined geometry for comparison to a target alteration metric stored on the controller. For example, the alteration metrics may include an axial convergence of opposing surfaces of the tooth, a smoothness of one or more surfaces of the tooth, or an alteration amount between one or more surfaces of the tooth before and after the dental preparation task in the instance of a PFM Crown Preparation. Numerous additional metrics can be calculated for comparison to corresponding target metrics stored on the controller depending upon the dental preparation task to be performed.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The invention augments conventional marking and grading system in dental teaching with a robotic platform that holds a set of sensory and actuation systems, automatic measuring sensor, data transmission system, data storage, and a software to capture, analyze and visualize the data, to provide dental and dental hygiene students with a set of important information, including the dimensions of one or more dental preparations when the dental apprentice has finished a dental task as well as to provide different angles of view captured by the sensory system to allow the student visually understand their dental performance skills in an examination, restorative, periodontal, prosthodontic, extraction/surgical, orthodontic, endodontic. In the automatic measurement system, a set of actuators attached to the robotic platform is utilized to move the sensor that reads the 3D coordinates of several points on each surface of the tooth, a data processing unit receives the measured coordinates, and a data transmission system then transfers the information to an automatic measurement system at trainer workstation in the classroom, preclinical laboratory, or in a remote location such as a home. In addition to sending to the trainer workstation, the apprentice is able to visualize the results on a local software before the submission. Each apprentice has an automatic measurement system. Each trainer may also have an automatic measurement system. The automatic measurement system at the trainer or apprentice workstation measures dimensions of the dental preparation in a linear, planar, or spatial coordinate system. In each apprentice workstation, the dimensions and geometry of the dental preparation may be compared and analyzed to provide feedback to each student. A display shows the regressed model of the tooth preparation that is recorded by the sensory system to provide the apprentices with the opportunity of understanding and improving their dental performance before working on an actual patient in the clinic. In summary, the invention improves the training, learning, and practicing processes of dental treatment through providing dental hygiene and dental students with the opportunity of visualizing and comparing their work with a standard dental preparation in a faster and more effective way than the existing method (marking directly by the trainer) which may include human error.

Figure 1:
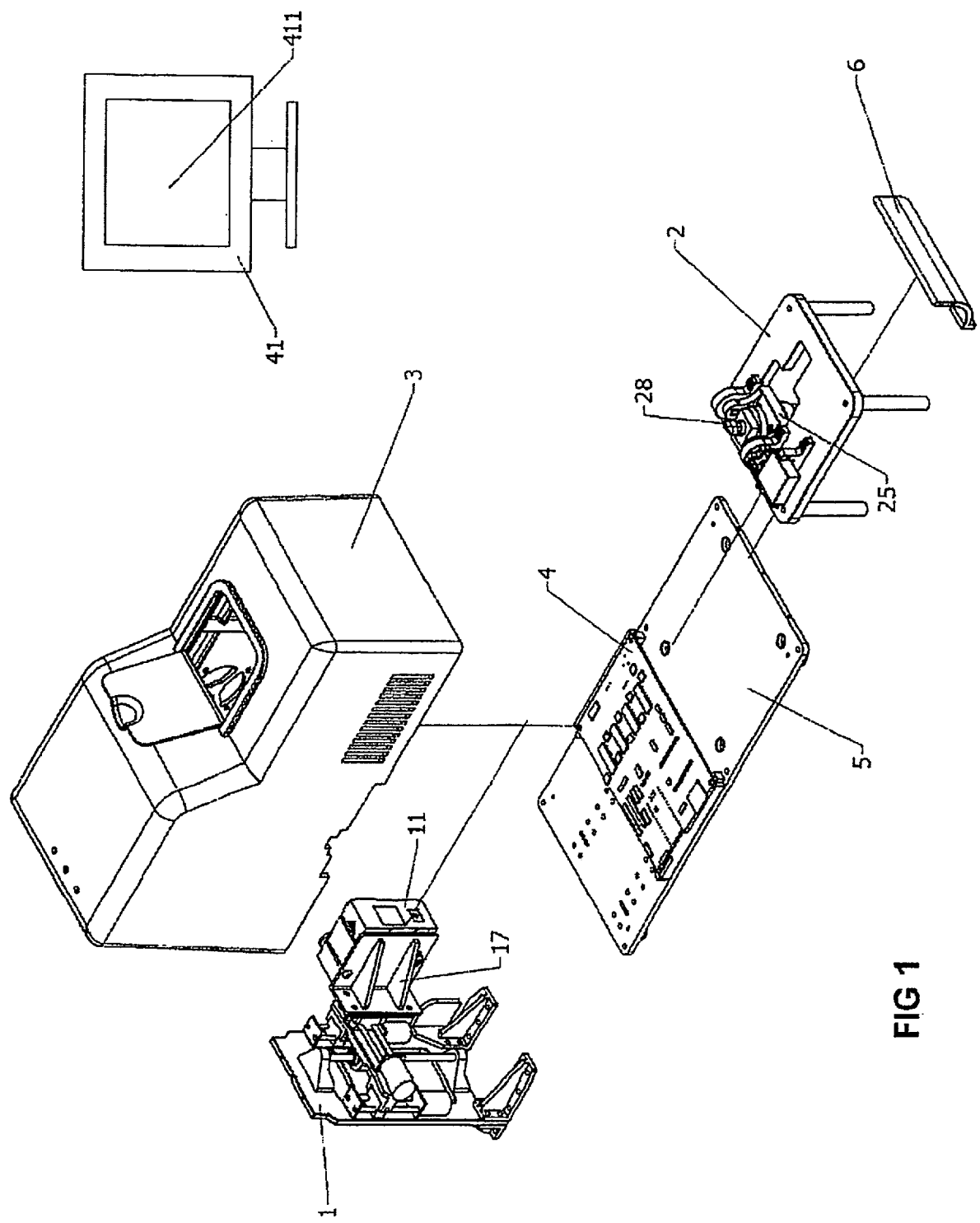
FIG. 1 shows the overall scheme of the apparatus that consists of different components of the system including the prismatic motorized and sensorized, actuation assembly, rotary motorized and sensorized, actuation assembly, processing unit, data storage system and the computer device with display.

FIG. 1 represents an overall picture of the automatic measurement system consisting of a first motorized actuation assembly 1 providing two vertical and longitudinal measurements for the sensory system 11 attached to the sensor holder 17, a second motorized actuation assembly 2 to provide rotations about the vertical and longitudinal axes of the tooth holder to which one or more teeth 28 are attached for measuring purposes, a control unit 4 in the form of a printed circuit board within the housing of the system that controls motions of actuators used in motorized actuation mechanisms 1 and 2. The data measured by the measurement sensor 11 is also transmitted by the control unit 4 to an associated computer device 41. The top cover 3 houses all the components of the automatic measurement system and provides easy access for placement and removal of one or more teeth 28. The linear motion assembly 1, rotatory motion assembly 2, housing 3, the control unit 4 and handle 6 are mounted onto a bottom plate 5. The handle 6 is used to carry the automatic measurement system.

Figure 2:
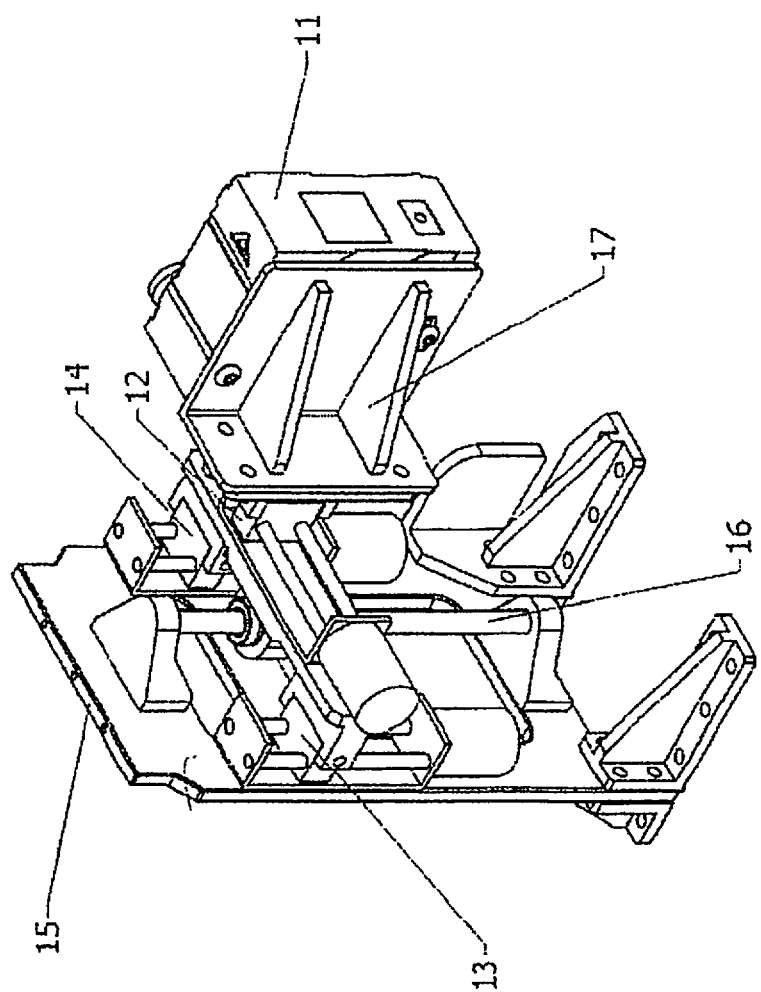
FIG. 2 shows the overall picture of the prismatic motorized and sensorized, actuation assembly.

FIG. 2 shows details of the linear motion assembly 1. The measuring sensor 11 is mounted onto the longitudinal sliding actuator 12 using the bracket assembly 17. The longitudinal sliding actuator 12 is further mounted to the vertical sliding actuators 13 and 14. The vertical sliding actuators 13 and 14 are attached to vertical frame 15 along with the vertical guiding rod 16. The linear motion assembly 1 positions the measuring sensor in the desired location and provides a smooth and continuous motion to record the coordinates of each surface of the tooth 28.

Figure 3:
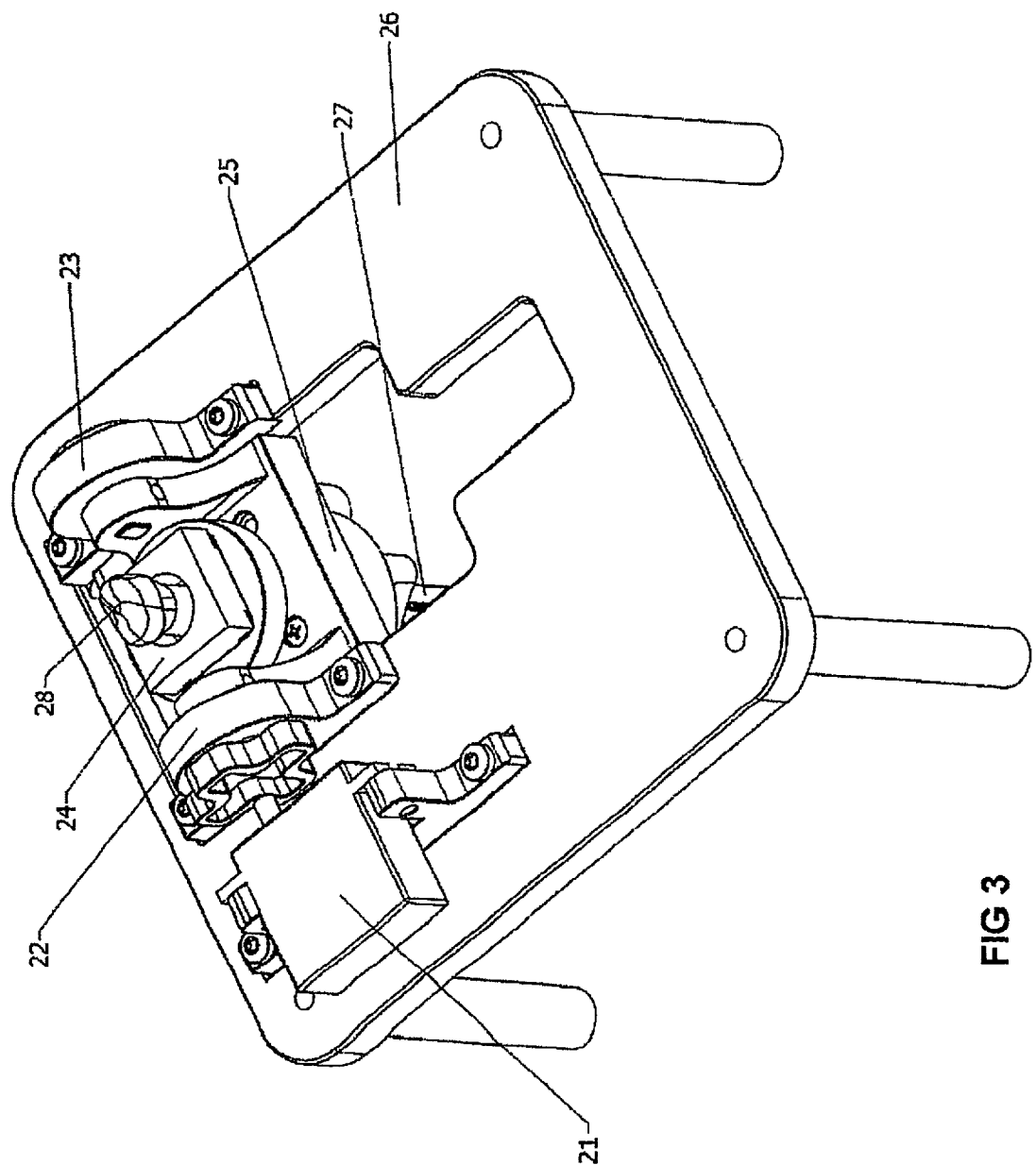
FIG. 3 shows the overall picture of the rotary motorized and sensorized, actuation assembly.

FIG. 3 shows details of the rotatory motion assembly 2. The rotatory motion assembly 2 is used to rotate one or more teeth 28 along the vertical and longitudinal axes. The tooth 28 is mounted on the tooth holder 24, which is inserted into the vertical rotating assembly 25. The tooth holder 24 also provides reference points to the measuring sensor 11. The rotating motion about the vertical axis is provided by the actuation system 27. The vertical rotating assembly 25 is mounted onto the table assembly 26 using bearing assemblies 22 and 23. The actuation system 21 provides rotational movement required to drive the vertical rotating assembly 25 about a longitudinal axis. The rotation of tooth 28 about the vertical and longitudinal axes is used to bring the target face of tooth 28, directly in front of the measuring sensor.

Figure 4:
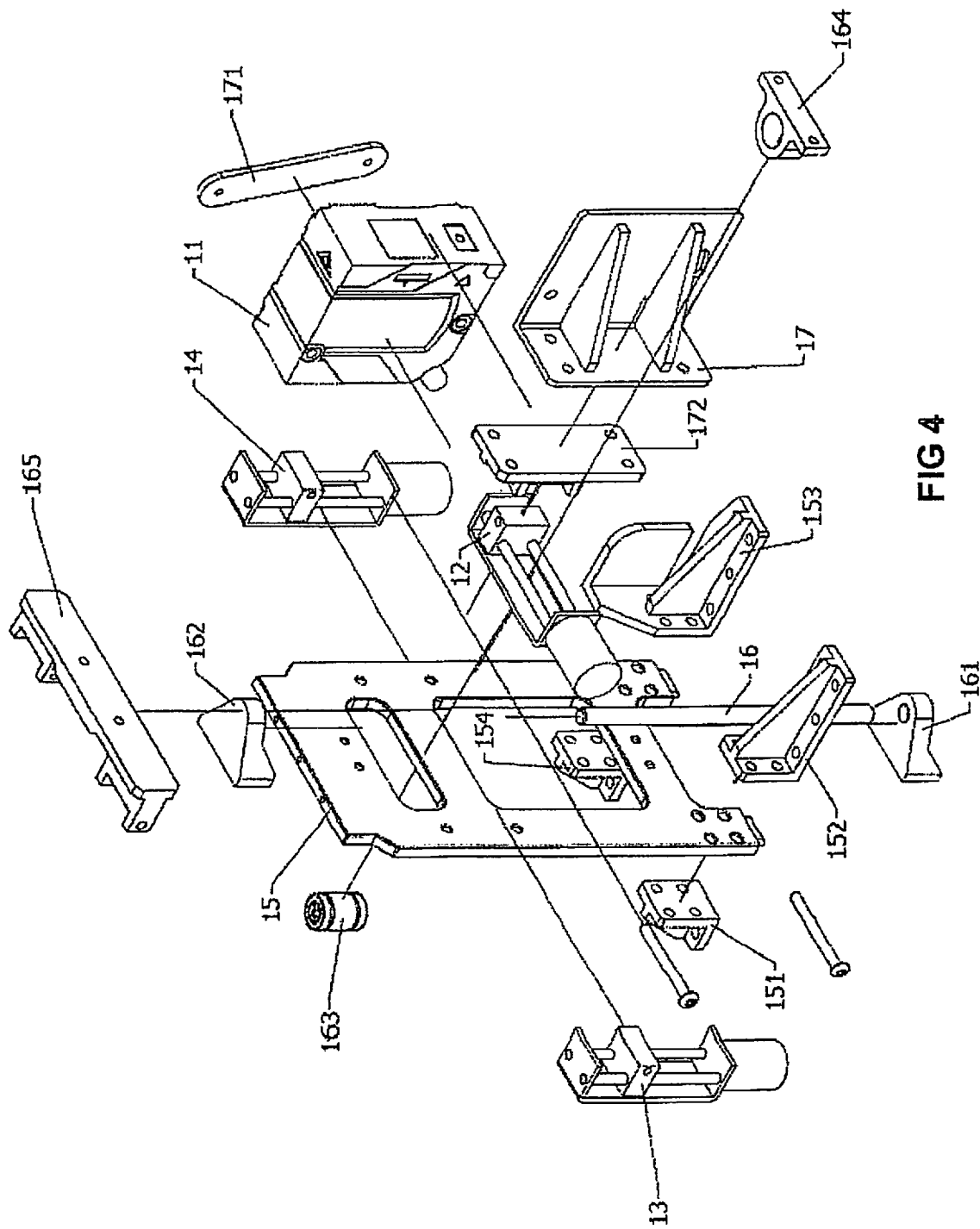
FIG. 4 shows the components of the prismatic motorized and sensorized, actuation assembly including the measuring sensor, sensor holder, prismatic actuators and associated sensory systems to provide feedback to the controller.

FIG. 4 shows the exploded view of the linear motion assembly 1. The measuring sensor 11 is fastened to main bracket 17 with bolts and nut plate 171. The main bracket 17 is connected to connecting bracket 172, which is then bolted to longitudinal motion actuator 12. The longitudinal motion actuator 12 is connected to vertical motion actuators 13 and 14 with bracket 165. The linear bearing 163 is connected to bracket 165 using the bearing housing 164. The guide rod 16 passes through the linear bearing 163 and is attached to the vertical frame 15 with the end connectors 162 and 161. The vertical motion actuators 13 and 14 are also bolted to the vertical frame 15. The vertical frame 15 is connected to base 5 using the brackets 151, 152, 153 and 154.

Figure 5:
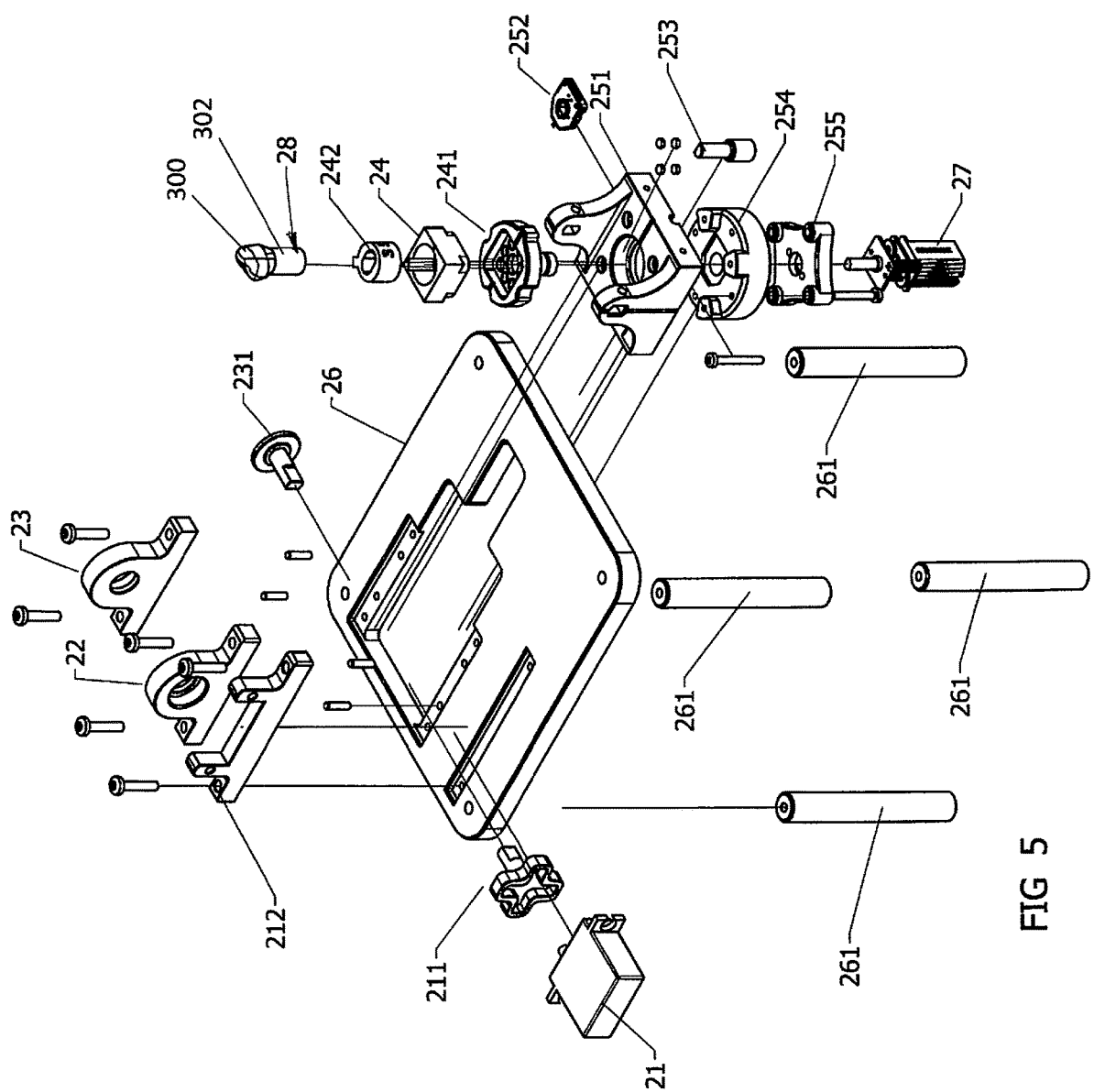
FIG. 5 shows the components of the rotary motorized and sensorized, actuation assembly including the tooth, tooth holder, rotary actuators and associated sensory systems to provide feedback to the controller.

FIG. 5 shows the exploded view of rotatory motion assembly 2. The tooth 28 is mounted to tooth holder 24 using an adapter member 242. The tooth holder 24 is inserted into rotating base 241. Tooth holder 24 provides easy removal and attachment of tooth 28 to the rotating base 241. The rotating base 241 is pushed to the mounting bracket 251. The actuation system 27 is connected to the sensor bracket 254 using the actuator bracket 255. The sensor bracket 254 is then bolted to the mounting bracket 251. The rotatory motion from the actuation system 27 is transmitted to the rotating base 241 through the adapter 253. The shaft of the actuation system 27 is inserted into the adaptor 253. The shaft of adaptor 253 passes through the sensor 252 and is inserted into the rotating base 241. The sensor 252 is pressed into the sensor bracket 254 and provides feedback regarding the angle of the actuation system. The vertical rotating assembly 25 is connected to bearing assemblies 22 and 23 using pin 231 and actuator hub 211. The bearing assemblies 22 and 23 are bolted to the table 26. The actuator 21 is connected to the table 26 using bracket 212 and transmits rotation about the longitudinal axis to the mounting bracket 251 through the actuator hub 211. Table assembly 26 is mounted onto base 5.

Figure 6:
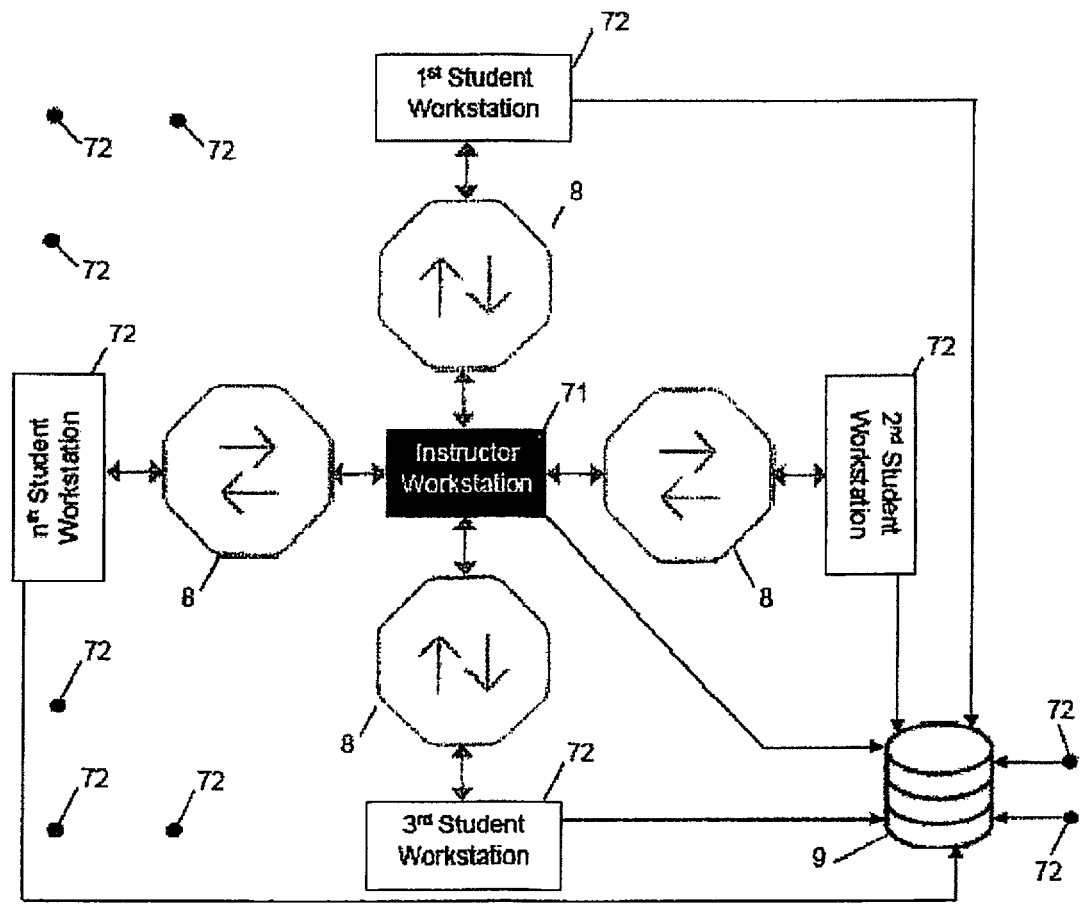
FIG. 6 shows an overall view of the workflow of the invention.

FIG. 6 presents the overall scheme of the apparatus and the method of using the apparatus. Said trainer workstation 71 is the location where a trainer is situated to score and mark the dental preparation conducted by a dental apprentice at an apprentice's workstation 72. The trainer communicates with each said apprentice workstation 72 through the data transmission system 8. Said data transmission system 8 can be a local network-based, a wired or wireless internet-based connection. Once the performance of the dental tasks is completed, data including data read by the measuring sensors at the trainer and apprentice' workstations as well as data obtained through calculation of the geometry of each surface of the tooth 28 are stored in said data storage system 9 for further purposes including for the use by apprentices to receive feedback on their dental skills and to share with the trainer or other dental apprentices. The data storage system 9 can be a hardware storage system located in the classroom or any cloud-based storage system. The data stored in the data storage system 9 include data read by the measuring sensors, data obtained through calculation of the geometry of each surface of the tooth 28 as well as the values of the actuators' displacements or velocities during the performance of the measuring procedure.

Referring now more generally to FIGS. 1 through 6, some aspects of the invention will now be described in further detail. As described herein, the automated measurement system generally includes an apparatus for use by a trainer 71 or a dental apprentice 72 or a plurality of dental apprentices 72 for use by individual trainees respectively. A suitable communication system or communications network 8 provides communication between the trainer workstation 71 and the apprentice's apparatus 72.

Said automated measurement system provides a dental scoring and grading system for use with or without a trainer workstation for practicing purposes comprising:
(i) a set of sensory systems mounted onto a custom-designed mechanical linkage to measure linear displacement components of the distance between multiple points on each surface of said measuring sensor and said tooth while a dental preparation is completed by a dental apprentice in a classroom, clinic, or laboratory, or outside school;
(ii) a set of actuators that are controlled to place said measuring sensor and said tooth in proper configuration for measuring the distance between said measuring sensor and the tooth surface points;
(iii) a controller that controls the motion of said measuring sensor and the mechanism of the tooth holder;
(iv) a processing unit, comprising (a) a main processor and (b) software including a graphical user interface for analyzing data of said sensory system and for displaying data of each student graphically and statistically.

The automated measurement system generally includes a base plate 5 arranged to be supported on a horizontal supporting surface. A central processing unit 4 is supported on the base plate towards a rear end thereof. The processing unit 4 includes a processor and a memory storing program instructions thereon that are executable by the processor to perform measurement procedure. A lower housing or case 3 mounts over top of the base plate 5 to enclose the central processing unit within the interior of the lower housing.

The automated measurement system is supported on the lower housing 5 adjacent a forward end thereof. The details of the automated measurement system will be described in further detail below. An upper housing 3 is connected to a rear of the lower housing 5 to extend upwardly therefrom so that a portion of the upper housing 3 is situated over and above the main components of the automated measurement system while being sufficiently spaced above the rotary motion assembly 2 so as not to restrict access to tooth holder 24 that is used for picking and placing tooth 28.

The linear motion assembly 1 supports a measuring sensory system 11 thereon which includes arranged to measure the coordinates of a number of points on each surface of tooth 28. The measuring sensory system 11 is held by the sensor holder 17 and a linkage 171 that embraces the measuring sensory system 11. The sensor holder 17 is also connected to a plate 172 through which the entire measuring sensory system 11 and its components are connected to the horizontal actuation system 12 that provides a linear motion along the horizontal axis. The horizontal actuation system 12 is connected to a holder 165 that connects the horizontal actuation system 12 and the measuring sensory system 11 to the vertical actuation systems 13, 14. The platforms uses two same vertical actuation systems 13, 14 to ensure that the horizontal actuation system 12 and the measuring sensory system 11 move with an optimal accuracy. To increase the accuracy in the alignment system, the alignment rod 16 and its supports 161, 162 are used in a place between the right vertical actuation system 14 and the left vertical actuation system 13. The alignment rod 16 and its supports 161, 162, the right vertical actuation system 14 and the left vertical actuation system 13 are connected to the vertical stand 15 that is rigidly connected to the lower base 5.

The rotary motion assembly 2 supports two actuation systems one to rotate horizontally 21, one to rotate vertically 27, both to provide the movement required for the tooth holder 24 to position the tooth 28 with respect to the measuring sensory system 11. The tooth holder 24 is supported by a component 241 that is connected to the parts 254 and 255 in order to have proper alignment when connected to the actuation system 27. There is a sensor 252 to measure the movement of the actuation system 27. The actuation system 21 is supported by the part 211 and bearings 22 and 23 to increase the stability of this part of the platform. The actuation system 21 and the actuation system 27 and their components are connected to the holder 26. The holder 26 is connected to the base plate 5 using the four legs 261.

Software 411 is associated with the apparatus. The software may be included in a personal computer 41 having its own internal processor and memory storing programming instructions thereon arranged to be executed by the processor for performing various additional functions associated with the automated measurement system in general and with another apparatus in particular. A data storage system 9 is also associated with the computer device that includes the software 411 for storing all data collected from the control unit 4 as described below. The control unit 4 of the apparatus and/or the external computer device 41 are arranged to receive user input and various input commands from the trainer or the apprentice to initiate the various functions associated with the apparatus. The control unit 4 of the trainee apparatus, the software 411 on the external computer device 41, data storage system 9, the control unit 4 of a trainer apparatus in communication with the trainee apparatus, and any additional computing device in communication directly or over a communication network collectively define a controller of the measurement system which executes programming instructions to perform the various functions of the system as described herein.

As described herein, the measurement apparatus is generally arranged for measuring dimensions of a tooth or a group of teeth, particularly before and after an alteration on the tooth anatomy undergoing a dental preparation, such as a reduction of a portion of the tooth for example. The apparatus generally includes (i) a base frame including a base plate 5 arranged to be supported in fixed relation to a suitable supporting surface, (ii) a tooth holder 24 supported on the base frame for supporting a conventional model of a tooth 28 thereon, (iii) a measurement sensor 11 supported on the base frame and arranged to sense a measured distance along a measurement axis of the sensor between the measurement sensor and a corresponding surface portion of a presented surface among the surfaces of the tooth supported on the tooth holder 24, (iv) a first actuation assembly 1 that supports the measurement sensor 11 for translating movement relative to the tooth holder 24 along two different translating axes within a common measurement plane oriented perpendicularly to the measurement axis, (v) a second actuation assembly 2 supporting the tooth holder 24 for angular movement relative to the measurement sensor 11 about two different rotational axes oriented perpendicularly to one another and parallel to the measurement plane so that the tooth holder can be positioned in a plurality of different angular orientations relative to the measurement sensor corresponding to different surfaces of the tooth being presented to the sensor for measurement respectively, and (vi) a controller operatively connected to each of the measurement sensor 11, the first actuation assembly 1 and the second actuation assembly 2 for communication with and operation of the connected components according to programming instructions of the controller.

In the illustrated embodiment, the base frame comprises a base plate 5 having footings thereon arranged to support the base plate on a suitable horizontal supporting surface such as a counter for example. A table 26 is coupled to the base plate 5 by suitable posts 261 so that the table 26 is part of the base frame in fixed relation to the base plate 5. The table 26 serves to support the second actuation assembly 2 thereon such that the tooth holder 24 is rotatable about the two different rotational axes relative to the base frame. An upright plate 15 is coupled to the base plate 5 using suitable brackets 151, 152, 153 and 154 so that the upright plate 15 is fixed in relation to the base plate 5 and also forms part of the base frame. The upright plate 15 supports the first actuation assembly 1 thereon such that the measurement sensor 11 carried by the first actuation assembly 1 is supported for translating movement along two different translating axes within the measurement plane relative to the base plate 5.

As noted above, the first actuation assembly 1 supports the measurement sensor 11 thereon. The measurement sensor 11 is arranged for measuring a distance along the measurement axis from the sensor to a location on the presented surface of the tooth that is intersected by the measurement axis. The controller is able to locate a reference point of the tooth and/or tooth holder, and knows the position of the tooth and the sensor relative to the holder. The controller can then use the measured distance between the sensor and the corresponding surface portion of the tooth intersected by the measurement axis to locate the corresponding surface portion of the tooth relative to the reference point. For each presented surface of the tooth corresponding to a respective angular orientation of the tooth relative to the measurement sensor as determined by operation of the second actuation assembly, the first actuation assembly is operated to displace the measurement sensor relative to the tooth holder through an array of measurement locations within the measurement plane to capture the measured distance to each corresponding surface portion at each measurement location for the respective surface of the tooth. The controller can thereby define a geometry of the respective surface of the tooth using the captured measure distances which in turn enable identification of the location of the corresponding surface portions relative to the reference point of the tooth or tooth holder.

The first translating axis of the first actuation assembly along which the sensor 11 is displaced is defined by the rod 16 and the first linear movement actuators 13 and 14. A first carriage frame (which supports the second linear movement actuator 12 thereon) is attached to the actuators 13 and 14 and is guided linearly along the rod 16 by the bearing 163 that slides along the rod 16. The first carriage frame includes horizontal guides thereon defining a second translating axis along which the second linear movement actuator 12 is mounted for translating movement perpendicularly to the first translating axis. A second carriage frame 172 is attached to the second actuator 12 for movement along the second translating axis together with the second linear movement actuator 12.

A bracket 17 supports the measurement sensor 11 on the second carriage frame 172. In this manner, operating the first linear movement actuators 13 and 14 acts to displace the measurement sensor 11 along the first translating axis of the measurement plane, while operating the second linear movement actuator 12 acts to displace the measurement sensor 11 along the second translating axis of the measurement plane. When measuring the geometry of a presented surface of the tooth corresponding to one of the prescribed angular orientations of the second actuation assembly 2, the controller operates the first linear movement actuators 13 and 14 and the second linear movement actuator 12 in a coordinated manner to displace the measurement sensor along sequential rows of measurement locations while operating the measurement sensor 11 to capture a measured distance at each of the measured locations in a grid pattern defining the array of measurement locations.

The second actuation assembly 2 supports the tooth holder 24 thereon so that the tooth 28 supported by the holder can be adjusted between a plurality of different angular orientations of the second actuation assembly in which the tooth is rotated about first and/or second rotational axes of the second actuation assembly between the different angular orientations. The first and second rotational axes are perpendicular to one another while lying in a common plane that is both parallel to the measurement plane and perpendicular to the measurement axis. Each of the first and second rotational axes passes through a tooth supported within the tooth holder so that a distance from a centre of the tooth to the measurement sensor does not substantially change as the tooth in the tooth holder is rotated between the different angular positions of the second actuation assembly.

The tooth holder is arranged to support a standardized model tooth 28 therein so that the tooth is supported at a prescribed orientation and location relative to the reference point so that measurements to corresponding surface portions of the tooth can be accurately located relative to the reference point for defining the geometry of the surfaces of the tooth from the sensor data.

The second actuation assembly 2 includes a pivot frame 251 that includes a platform and two pivot arms standing upwardly from opposing sides of the platform at diametrically opposing sides of a tooth 28 supported in the tooth holder 24 generally located centrally above the platform. The two arms of the pivot frame 251 form a pivot connection with the pin 231 and the hub 211 respectively at spaced positions along the first rotational axis. The first rotary actuator 21 includes a housing that is anchored relative to the table 26 of the base frame and a rotary output operatively connected to the hub 211 to drive rotation of the hub and the pivot frame 251 coupled to the hub about the first rotational axis. Suitable bearings 22 and 23 rotatably support the pin 231 and the hub 211 at opposing sides of the tooth holder along the first rotational axis.

The pivot frame 251 includes a central opening that receives the stem of the rotating base 241 therethrough. The rotating base 241 is rotatable relative to the pivot frame about the second rotational axis of the second actuation assembly 2. The rotating base 241 supports the base 24 of the tooth holder thereon. A stem of the rotating base 241 extends downwardly through the central opening in the pivot frame 251. A second rotary actuator 27 includes a housing that is mounted in fixed relation to the bottom side of the pivot frame 251 by the mounting bracket 255. The rotary output of the second rotary actuator 27 is coupled to the bottom stem of the rotating base 241 so that the rotating base 241 is rotatable about the second rotational axis together with the output of the second rotary actuator 27. A sensor 252 supported in the bracket 254 locates the angular position of the rotating base 241 relative to the pivot frame 251. A different type of the second rotary actuator 27 can include an encoder to play the role of the sensor 252.

The controller is a computer device including one or more processors and one or more memories storing programming instructions thereon to be executed by the processor(s) for executing the various functions of the present invention as described herein. The overall functionality of the controller as described herein may be entirely contained on the printed circuit board defining the control unit 4 mounted on the base frame of the apparatus, or the control unit 4 on the base frame may cooperate with the external computer device 41 that also includes a processor and a memory storing programming instructions executable by that processor so that the overall function of the controller may be a combination of steps executed on the external computer device 41 and steps executed on the control unit 4 within the housing 3 of the apparatus. The external computer device 41 and the control unit 4 on the base frame may each include a respective input device for receiving user instructions and which communicate over a communication network with other measurement apparatuses, such as a trainer apparatus as described above in a manner that allows suitable communication of data between the various systems to execute the functions of the apparatus as required.

When the apparatus is actuated for collecting measurement data, the controller receives user input through the input device relating to a selected mode of operation such as a desired measurement to be performed for example for scoring a performance aspect of a trainee performing a dental preparation. Depending upon the mode selected by the user, the controller will respond by selecting which surfaces of the tooth are to be presented for measurement and then automatically actuates the first and second actuation assemblies 1 and 2 in the appropriate sequence. For each surface of the tooth for which measurement data is desired, the controller operates the second actuation assembly 2 to position the tooth within the tooth holder at each corresponding angular orientation. When positioned at each angular orientation, the controller then operates the first actuation assembly 1 for displacing the sensor through the desired array of measurement locations by displacing the measurement sensor along sequential rows or columns in sequence while pausing sufficiently at each measurement location along each row a sufficient duration to capture the corresponding measured distance at the measurement location.

The apparatus may be initially used to capture the overall geometry of the tooth before reduction of the tooth during a dental preparation. As the tooth is a standardized model tooth, the dimensions and geometry of the tooth may be captured a single time and stored on a local or cloud database of the controller for subsequent recall in performing comparisons between a reduced tooth and the tooth before reduction. The stored data are accessible by the user via software 411.

In one instance, the apparatus is arranged to calculate the alteration on the tooth prepared by a trainee relative to the tooth before alteration and then compare the calculated alteration amount, in terms of distances, angles, smoothness, edge sharpness and overall look, to the corresponding target alteration amount of a target altered tooth. The target altered tooth may be a standardized model stored on the database of the controller, or may be a tooth which has been altered by a trainer and measured on a corresponding trainer apparatus for subsequent communication to the trainee apparatus for comparison. A score relating to overall alteration is initially calculated by calculating a difference or alteration amount between each measured surface portion of the altered tooth and the corresponding surface portion along the same measurement axis of the intact tooth before a dental preparation task. The alteration amounts for one or more surfaces of the tooth that are presented for measurement are compared with corresponding alteration amounts of the prescribed target tooth. A quantitative score can then be calculated which is a measure of similarity between the alteration amounts of the tooth prepared by the trainee and the alteration amounts of the prescribed target tooth.

Figure 7:
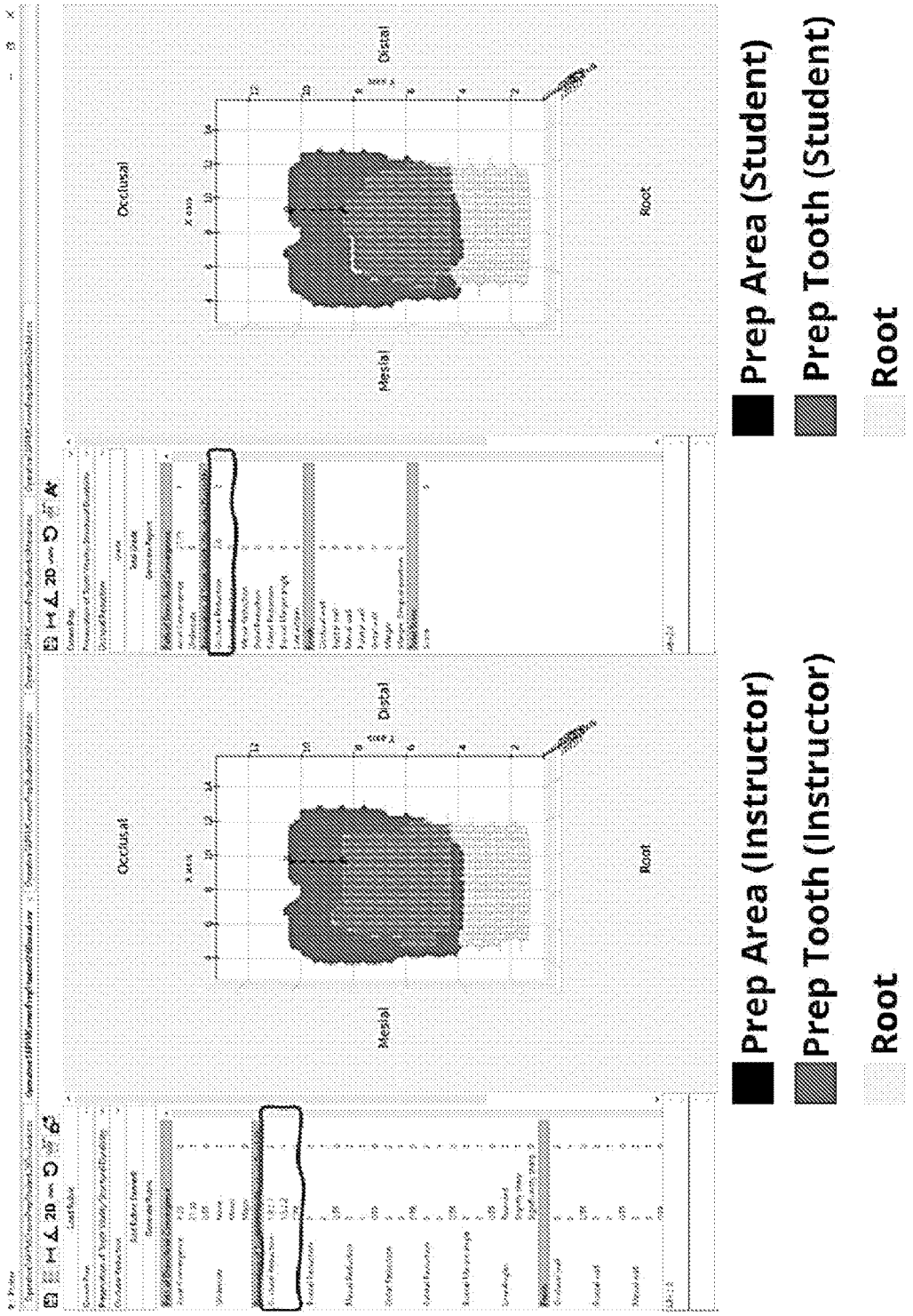
FIG. 7 is a screenshot of a graphical output of the apparatus illustrating a reduction of the tooth measured by the apparatus compared to the intact tooth before reduction for both a trainee using a trainee apparatus and a trainer using a trainer apparatus.

The second actuation assembly 2 is arranged to present any one of four sides or the top of a tooth at any given time for measurement by the measurement sensor 11. The various surfaces that can be presented include an Occlusal/Incisal surface, a Buccal/Vestibular surface, a Mesial surface, a Distal surface and a Palatal/Lingual surface. For each presented surface, the various alteration amounts corresponding to the different measurement locations of the array of the measurement plane can be measured and calculated for comparison resulting in a respective alteration score. As shown in FIG. 7, an example of calculated Occlusal reduction amounts for a trainer and trainee are shown calculated and graphically presented for performing both a quantitative and visual comparison. Similar alteration amounts can be calculated for the other surfaces of the tooth.

Figure 8:
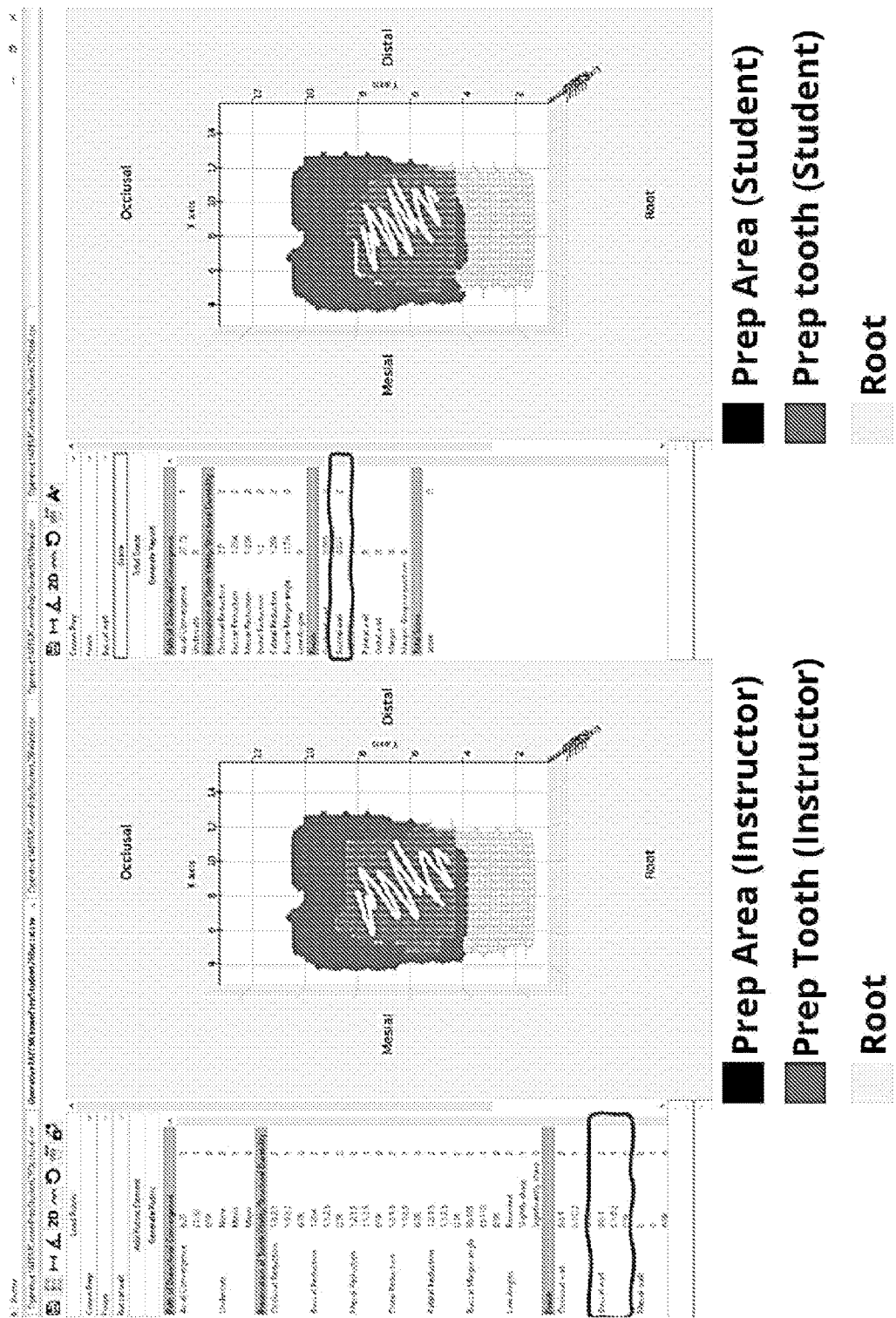
FIG. 8 is a screenshot of a graphical output of the apparatus illustrating a smoothness of a reduced surface of the tooth measured by the trainee apparatus compared to a smoothness of a reduced surface of an auxiliary tooth from a trainer apparatus.

In another instance, the apparatus is arranged to measure other target metrics such as a smoothness of any one of the five surfaces of the altered tooth (such as Buccal wall surface) that are presented for measurement. By selecting an area on each tooth surface, a variability between the measured distances from the measurement sensor to different points of the surface captured by the apparatus can be used to calculate a smoothness amount. The smoothness amounts for various surfaces can in turn be calculated into a single smoothness score value that represents an overall smoothness of the surface. As shown in FIG. 8, an example of the calculated smoothness score for a trainer and trainee are shown calculated and graphically presented for providing both a quantitative and visual comparison. Similar smoothness scores can be calculated for the other surfaces of the tooth.

Figure 9:
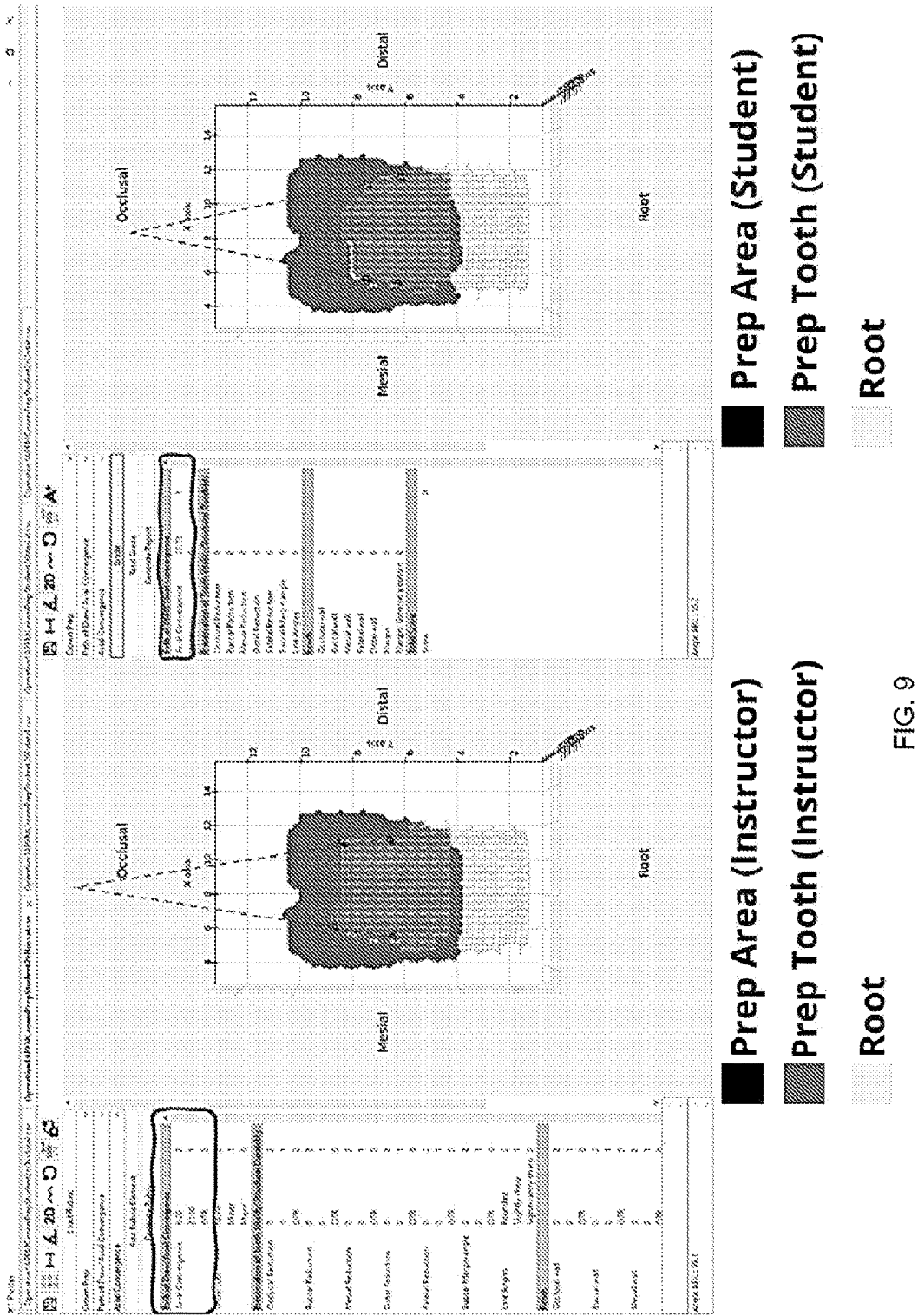
FIG. 9 is a screenshot of a graphical output of the apparatus illustrating an axial convergence of opposed reduced surfaces of the tooth as measured by the trainee apparatus compared to an axial convergence of opposed reduced surfaces of an auxiliary tooth from a trainer apparatus.
Figure 10:
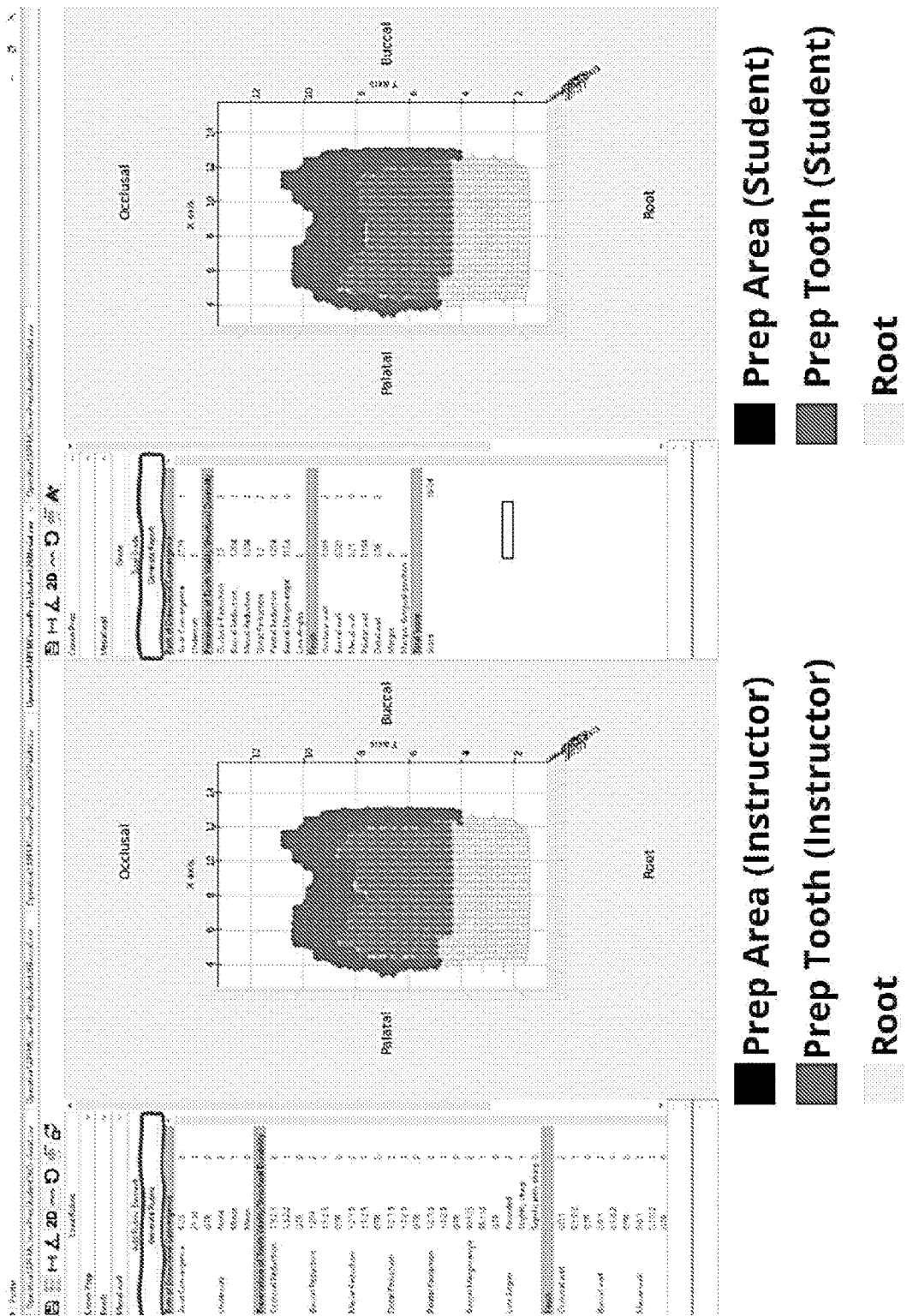
FIG. 10 is a screenshot of a graphical output of the apparatus illustrating a comparison of various measurements relating to the reduced surfaces of the tooth as measured by the trainee apparatus compared to corresponding measurements relating to reduced surfaces of an auxiliary tooth from a trainer apparatus.

In another instance, the apparatus is arranged to calculate an axial convergence between reduced surfaces at diametrically opposing sides of the reduced tooth. Once the geometry of two opposing surfaces becomes known from the measurement data acquired from the sensor 11, an axis is extended from each of the opposing reduced surfaces of the tooth. When represented in two dimensions according to FIG. 9, the intersection point of the extended axes can be calculated to determine the axial convergence. The calculated location of the convergence points for a tooth prepared by a trainee and a tooth prepared by a trainer are shown calculated and graphically presented for performing both a quantitative and a visual comparison of the axial convergence of the trainer tooth and the trainee tooth as shown in FIG. 9.

The various comparison metrics such as ones noted above can be calculated for various surfaces of the trainee tooth and the trainer tooth using captured measurement data of the various surfaces of the tooth before and after reduction is performed. All of the calculated metrics relating to the tooth prepared by the trainee are compared to the corresponding metrics relating to the tooth prepared by the trainer. The various metrics can be used to calculate an overall score representing an overall similarity of all of the various metrics noted above. While the use of a tooth prepared by a trainer serves as one example of a prescribed target reduction of a tooth relative to which the trainee tooth is compared for scoring, other prescribed target alterations may be stored on the database as a basis for scoring. For example, the prescribed target alteration may relate to a previously prepared tooth by a trainer and stored on the system for subsequent use, or the prescribed target alteration may correspond to a standardized dental preparation rubric stored on the controller solely for scoring purposes.

For each tooth to be measured, the controller operates the actuation assemblies and the measurement sensor 11 to capture sufficient measurement data relating to the position of various surface portions of the various surfaces of the tooth so that the location of the corresponding surfaces relative to a reference point of the tooth holder can be calculated and the corresponding geometry of the tooth can be rendered in two dimensions or in three dimensions from the relevant collected measured distances. The rendered graphical images generated by the combination of the control unit 4 and the software 411 of the controller can be displayed to the operator of the apparatus through the display 41 of the computer device. When presenting images in two dimensions, each of the five sides of the tooth can be individually presented as an elevational view in which the resulting perimeter shape of the tooth both before and after reduction are superimposed upon one another for each of the trainer and trainee teeth as shown in FIGS. 7 through 10. More particularly a graphical image is generated in which the alteration of the tooth is graphically represented to show a perimeter contour of the tooth before and after the preparation task at the respective elevation view.

The resolution of the rendered images is dependent upon the number of measurements collected by the controller. Once a mode is selected, the controller typically operates movement of the sensor relative to the tooth to collect measurements at each of the measurement locations of the array for each measurement plane relative to the tooth according to a prescribed number of measurement locations per prescribed unit of length designated by the controller. This prescribed number of measurement locations per prescribed unit of length stored on the controller can be adjusted by the user. When increasing the number of measurement locations, more data is collected and the resulting graphical images have finer resolution. Furthermore, when performing various comparison calculations between the altered tooth by the trainee and the prescribed target reduction, an increased resolution results in more data points being used to perform the comparison which in turn provides a more accurate score representative of the similarity between the measured alteration and the target alteration.

According to any of the modes of operation, the controller attempts to collect a measured distance at each of the prescribed measurement locations corresponding to the selected mode. Upon completion of a measurement cycle in which the measurement sensor has been displaced through all of the measurement locations of each surface to be presented for measurement, if the controller subsequently determines that an expected measured distance has not been recorded or has recorded an erroneous value that is inconsistent with other recorded values, the controller may determine an alert condition and prepare an alert to be communicated to the user by various means.

As described above, the controller maps the geometry of each surface of the tooth by using the captured measured distances to locate corresponding surface portions of the tooth intersected by the measurement axis relative to a reference point of the tooth or tooth holder. Accordingly, the tooth holder is required to accurately position the tooth relative to the reference point for accurate measurement.

In this instance the tooth is a conventional model tooth which is standardized in the dental industry in which the model tooth includes a main tooth portion 300 representative of the exposed portion of the tooth and a cervical third section 302 below the main tooth portion.

For each tooth type of the various model teeth, the present invention provides a corresponding adapter member 242 having a suitable tooth socket formed therein which mates with the cervical third section 302 of the model tooth such that the cervical third section only fits within the tooth socket of the adapter member in a single orientation. The adapter member 242 similarly includes a mounting portion having a non-circular shape that is longitudinally slidable into an adapter socket within the tooth holder 24. The set of adapter members 242 have uniquely shaped tooth sockets therein for fitting only the corresponding tooth type therein in a single prescribed orientation, however the mounting portions of all adapter members are identical to one another so as to be mountable on the tooth holder 24 interchangeably with one another. As the mounting portion of each adapter member only mounts into the corresponding tooth socket in the tooth holder 24 in a single prescribed orientation and location, the orientation and location of each model tooth relative to the tooth holder 24 can be precisely and repetitively located relative to the reference point of the system.

As a result of the model teeth being accurately located relative to the tooth holder regardless of the tooth type, the geometry of each tooth type before alteration, resulted from a dental preparation task, may be captured at a single time and stored on the data storage system 9 for all subsequent comparisons of the alteration of a tooth relative to the intact tooth before a dental preparation task. Similarly, the prescribed target reduction based on an altered tooth prepared by an instructor or trainer can be acquired at one time and stored on the data storage system 9 of the controller for subsequent comparisons, or a newly altered tooth can be prepared by the trainer and measured for comparison at any time.

As described herein, the mapping of the surface geometry of the altered tooth requires that for each measurement location, (i) a calculated distance is captured and (ii) the relationship of the measurement sensor relative to the reference point of the tooth holder must be known. This allows calculation of the location of the corresponding surface portion of the tooth relative to the reference point. This requires that the location of the measurement sensor relative to the reference point of the tooth holder be precisely known (i) for each measurement location within the measurement plane as controlled by the first actuation assembly and (ii) for each angular orientation of the tooth presented by the second actuation assembly. In this regard, position feedback sensors are associated with each of the actuators of the system that serve to measure the relative position of the actuators for calculating the position of the measurement sensor relative to the reference point of the tooth in the tooth holder at each measurement location.

When the at least one automated measurement system further comprises a sensory system arranged to measure the coordinates of multiple points on at least one side of said tooth, the processing unit may be arranged to compare the shape of the tooth before and after dental preparation.

The processing unit of at least one said automated measurement system is preferably arranged to operate the actuation system based on a pre-set resolution and the number of points need to be sampled, according to the program given to the processing unit.

The processing unit of at least one automated measurement system may be arranged to automatically generate an alert if at least one or more points are missed to be measured by the sensory system of the automated measurement system at the apprentice or trainer workstation.

The characteristics sensed by the sensory system of at least one said automated measurement system preferably include linear displacements between the sensory system and the tooth located on the tooth holder of the automated measurement system along one, two, or three axes.

The automated measurement system in some instances includes a single apprentice's automated measurement system, yet in other instances includes a plurality of apprentice's automated measurement systems.

The automated measurement system may be used in combination with the trainer's automated measurement system and a data transmission system in communication between the trainer's automated measurement system and at least one said apprentice's automated measurement system so as to be arranged to communicate at least one measured angular or linear displacement component of the automated measurement system at the trainer's automated measurement system with the processing unit of at least one said apprentice's automated measurement system.

When the automated measurement system further comprises a computer programming arranged to render at least one surface of said tooth, at least one said automated measurement system preferably comprises a display arranged to show the 2D and 3D renderings of the tooth and statistical and numerical information of each surface before and after dental preparation.

When the automated measurement system includes a processing system arranged to store the information measured by the measurement sensor along with at least one sensed linear displacement components between the measurement sensor and the tooth, the processing unit is preferably arranged to compare the geometry of at least one surface of the tooth at the automated measurement system at the trainer or apprentice workstation.

When the automated measurement system includes a processing system arranged to store the information calculations done by the processing unit, the processing unit is preferably arranged to compare the geometry of at least one surface of the tooth at the automated measurement system at the trainer or apprentice workstation.

The sensory system of the automated measurement system may comprise proximity sensors arranged to measure the distance between the tooth and the measuring sensor.

The sensory system of the automated measurement system may comprise capacitive, capacitive displacement sensor, through-beam sensor, Doppler effect (sensor based on Doppler effect), inductive, magnetic including magnetic proximity fuse, optical, photoelectric, photocell, reflective, convergent reflective, laser rangefinder, passive (such as charge-coupled devices), passive thermal infrared, radar, reflection of ionizing radiation, sonar (typically active or passive), ultrasonic sensor, fiber optics sensor or Hall effect sensor arranged to measure the distance between the tooth and the measuring sensor.

The sensory system of the automated measurement system may comprise inertial sensors including gyros, encoders, and accelerometers and any combination of inertial sensors with ultrawideband systems, or cameras arranged to measure the distance between the tooth and the measuring sensor.

The sensory system of automated measurement system may be arranged to measure the distance between the tooth and the measuring sensor along three Cartesian axes that are orthogonal to each other.

The sensory system of automated measurement system may be arranged to measure the distance between the tooth and the measuring sensor along any one of polar, cylindrical, spherical, homogeneous, or curvilinear coordinate systems.

The actuation systems of said automated measurement system may comprise a combination of electromagnetic, hydraulic, pneumatic, piezoelectric, muscle wire, piezo-ultrasonic, ultrasonic, tactile, electrostatic, electro-rheological fluid-based, or polymer-based actuator, or a manual actuation system.

The automated measurement system as described above, may be used without the trainer apparats to allow the apprentice or trainee having quantitative feedback from the dental preparation.

The automated measurement system preferably also includes (i) a data transmission system to communicate between said trainer's automated measurement system and said apprentice' automated measurement system in a multilateral fashion; and (ii) a data storage system to store data measured and analyzed at the trainer and students' automated measurement systems.

The invention may further relate to a method of use of the automated measurement system wherein the dental procedure includes examination, endodontics, prosthodontics, operative work, restorative work, surgery, extraction, or periodontics work. The procedure may include any one, or all, of piercing, cutting, forming hard, and soft tissues.

The automated measurement system may also be provided as a kit comprising the automated measurement system according to any aspect of the present invention noted above and a sheet of instructions for use thereof.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. An automated measurement apparatus for measuring dimensions of a tooth having a plurality of surfaces, the apparatus comprising:
   a base frame;
   a tooth holder supported on the base frame and arranged to support the tooth therein;
   a measurement sensor supported on the base frame and arranged to sense a measured distance along a measurement axis of the sensor between the measurement sensor and a corresponding surface portion of one of the surfaces of the tooth;
   a first actuation assembly supporting the measurement sensor for translating movement relative to the tooth holder along two different translating axes within a measurement plane oriented perpendicularly to the measurement axis;
   a second actuation assembly supporting the tooth holder for angular movement relative to the measurement sensor about at least one rotational axis oriented parallel to the measurement plane between a plurality of different angular orientations corresponding to different ones of the surfaces of the tooth to be measured respectively;

a controller operatively connected to the measurement sensor, the first actuation assembly and the second actuation assembly, whereby the controller is arranged to:
  (i) operate the second actuation assembly to locate the tooth holder relative to the measurement sensor in at least one of the angular orientations of the second actuation assembly; and
  (ii) for said at least one of the angular orientations of the second actuation assembly, operate the first actuation assembly to displace the measurement sensor relative to the tooth holder through an array of measurement locations within the measurement plane to capture the measured distance to the corresponding surface portion at each measurement location for the respective surface of the tooth and thereby define a geometry of the respective surface of the tooth.

2. The apparatus according to claim 1 wherein the first actuation assembly supports the measurement sensors for movement relative to the base frame within the measurement plane and the second actuation assembly supports the tooth holder for angular movement relative to the base frame between the different angular orientations.

3. The apparatus according to claim 1 wherein the controller is arranged to (i) operate the second actuation assembly to locate the tooth holder in a plurality of the angular orientations of the second actuation assembly, (ii) operate the first actuation assembly to displace the measurement sensor relative to the tooth holder through said array of measurement locations within the measurement plane at each of the angular orientations to capture the measured distance to the corresponding surface portion at each measurement location, and (iii) generate a three dimensional model of the tooth using the captured measured distances from each of the measurement locations.

4. The apparatus according to claim 1 wherein said at least one rotational axis of the second actuation assembly comprises (i) a first rotational axis and (ii) a second rotational axis oriented transversely to the first rotational axis.

5. The apparatus according to claim 4 wherein the second actuation assembly comprises (i) a first rotary actuator driving rotation of the tooth holder relative to the measurement sensor about the first rotational axis and (ii) a second rotary actuator driving rotation of the tooth holder relative to the measurement sensor about the second rotational axis.

6. The apparatus according to claim 1 further comprising:
  the two different translating axes including a first translating axis and a second translating axis oriented transversely to the first translating axis; and
  the first actuation assembly including (i) a first linear movement actuator driving linear movement of the measurement sensor relative to the tooth holder along the first translating axis and (ii) a second linear movement actuator driving linear movement of the measurement sensor relative to the tooth holder along the second translating axis.

7. The apparatus according to claim 1 wherein the tooth holder is arranged to support the tooth at a prescribed location and orientation relative to a reference point of the tooth holder and wherein the controller is arranged to calculate a location of each measured surface portion relative to the reference point using the corresponding measured distance measured by the measurement sensor.

8. The apparatus according to claim 7 in combination with a plurality of adapter members arranged to be interchangeably mounted within an adapter socket in the tooth holder, each adapter member being mountable within the adapter socket in a single prescribed orientation, and each adapter member further comprising a tooth socket arranged to receive a conventional model tooth therein in a single prescribed orientation, the tooth sockets of the adapter members being different from one another such that each adapter member is arranged to receive one of a plurality of differently configured conventional model teeth therein.

9. The apparatus according to claim 1 further comprising:
  an input device arranged to receive user input;
  the controller including a plurality of measurement modes corresponding to different surfaces or contours of the tooth to be measured, each measurement mode defining a unique operating sequence of the first and second actuation assemblies;
  the controller being arranged to select one or more of the angular orientations of the second actuation assembly and operate the first actuation assembly at each selected angular orientation according to selection of the measurement mode input by a user through the input device.

10. The apparatus according to claim 1 for use with a display, the controller being arranged for communicating a graphical image to the display, and the controller being arranged to generate the graphical image such that the graphical image represents the geometry of the tooth defined by the measured distances captured by the measurement sensor.

11. The apparatus according to claim 10 wherein the controller is arranged to generate the graphical image by rendering a two-dimensional image of the tooth representing the geometry of the tooth defined by the measured distances captured by the measurement sensor.

12. The apparatus according to claim 10 wherein the controller is arranged to generate the graphical image by rendering a three-dimensional image of the tooth representing the geometry of the tooth defined by the measured distances captured by the measurement sensor.

13. The apparatus according to claim 1 wherein the controller is arranged to operate the first actuation assembly and the measurement sensor to capture the measured distance at a prescribed number of measurement locations per unit of prescribed length across the array, said prescribed number of measurement locations being adjustable in response to user input through an input device in communication with the controller, whereby a resolution of the defined geometry of the respective surface of the tooth is adjusted by adjusting said prescribed number of measurement locations.

14. The apparatus according to claim 1 wherein the controller is arranged to (i) determine if the measured distance was not captured at one of the measurement locations designated by the controller and (ii) generate an alert to be communicated to a user of the apparatus in response to determination that the measured distance was not captured at said one of the measurement locations designated by the controller.

15. The apparatus according to claim 1 further comprising the controller being further arranged to (i) define the geometry of the surface of the tooth subsequent to an alteration of an anatomy of the tooth resulting from a dental preparation task and (ii) compare the defined geometry of the surface of the tooth to a prescribed tooth geometry before alteration to calculate an alteration amount between the defined geometry and the prescribed tooth geometry before alteration.

16. The apparatus according to claim 1 further comprising the controller being further arranged to (i) define the geometry of the surface of the tooth subsequent to an alteration of an anatomy of the tooth resulting from a dental preparation task and (ii) calculate an alteration metric representing one or more aspects of the defined geometry for comparison to a target alteration metric stored on the controller.

17. An automated measurement apparatus for measuring dimensions of a tooth having a plurality of surfaces, the apparatus comprising:
 a base frame;
 a tooth holder supported on the base frame and arranged to support the tooth therein;
 a measurement sensor assembly supported on the base frame so as to be arranged to capture measurement data related to the shape of the tooth;
 a controller operatively connected to the measurement sensor assembly so as to be arranged to define a geometry of one or more of the surfaces of the tooth based on measurement data captured by the measurement sensor assembly;
 the controller being further arranged to (i) define the geometry of the tooth subsequent to an alteration of the tooth and (ii) calculate an alteration amount between the defined geometry and a prescribed tooth geometry before alteration of the tooth by comparing the defined geometry of the tooth to the prescribed tooth geometry before alteration.

18. The apparatus according to claim 17 wherein the controller is further arranged to generate a graphical representation of the defined geometry of the tooth subsequent to the alteration superimposed upon the prescribed tooth geometry before alteration.

19. The apparatus according to claim 17 wherein the controller is further arranged to compare the calculated alteration amount to a target alteration amount stored on the controller and calculate a score representing a similarity between the calculated alteration amount and the target alteration amount.

20. The apparatus according to claim 19 in combination with a trainer apparatus which is substantially identical to the automated measurement apparatus, the target alteration amount being derived from an auxiliary tooth having a geometry defined by the trainer apparatus subsequent to an alteration of the auxiliary tooth by a trainer.

* * * * *